(12) United States Patent
Neil et al.

(10) Patent No.: US 7,779,429 B2
(45) Date of Patent: Aug. 17, 2010

(54) METHOD AND MACHINE-READABLE MEDIUM FOR BUILDING DISTRIBUTED SOFTWARE

(75) Inventors: Tim Neil, Mississauga (CA); Steve Grenier, Georgetown (CA); David Burgess, Markham (CA)

(73) Assignee: Research in Motion Limited, Waterloo, Ontario (CA)

( * ) Notice: Subject to any disclaimer, the term of this patent is extended or adjusted under 35 U.S.C. 154(b) by 1034 days.

(21) Appl. No.: 11/465,619

(22) Filed: Aug. 18, 2006

(65) Prior Publication Data

US 2008/0127233 A1    May 29, 2008

(51) Int. Cl.
*G06F 3/00* (2006.01)
*G06F 9/45* (2006.01)
(52) U.S. Cl. .................. 719/328; 719/330; 717/159
(58) Field of Classification Search .................. 719/328, 719/330; 717/159
See application file for complete search history.

(56) References Cited

U.S. PATENT DOCUMENTS

| | | | |
|---|---|---|---|
| 5,778,228 A * | 7/1998 | Wei ............................ | 719/328 |
| 6,157,960 A | 12/2000 | Kaminsky et al. | |
| 6,321,275 B1 * | 11/2001 | McQuistan et al. ......... | 719/330 |
| 6,684,261 B1 * | 1/2004 | Orton et al. .................. | 719/328 |
| 6,725,451 B1 * | 4/2004 | Schuetz et al. ............... | 717/151 |
| 6,973,657 B1 * | 12/2005 | Ahmad et al. ................ | 719/315 |
| 2004/0111701 A1 | 6/2004 | Beust | |

FOREIGN PATENT DOCUMENTS

CA    2210755    1/1999
GB    2326255    12/1998

OTHER PUBLICATIONS

Protocol Compiling and Lower Level RPC Programming URL .cs.cf.ac.uk/Dave/C/node34.html.
Remote Procedure Calls (RPC) URL .cs.cf.ac.uk/Dave/C/node33.html.
rpcgen Programming Guide URL docs.freebsd.org/44doc/psd/22.rpcgen/paper.pdf.
JavaParty-transparent remote objects in Java, Philippsen M. et al, Concurrency: Practice and Experience, John Wiley & Sons, GB. Nov. 1997.
Automatic Distribution of Object-Oriented Programs, Jul. 4, 2003, URL:.dis.fu-berlin.de/2003/155/indexe.html>.
European Patent Office, EPO Office Communication dated Sep. 22, 2009 in relation to European Patent Application No. 06 119 201.9-211.

* cited by examiner

*Primary Examiner*—Lechi Truong

(57) ABSTRACT

In a method for building distributed software, a single computer program may be written which includes distinct sets of routines defining operation at distinct computing devices (or types of computing devices) in a distributed system. Direct calls may be made between routines, even if the routines define operation of distinct computing devices. Through examination and processing of the computer program, multiple computer programs which collectively constitute distributed software for the distributed system are created. Each program defines the operation of a computing device within the system. Direct calls are emulated using instructions for inter-process communication which effect remote routine invocation transparently from the perspective of the developer. In the result, the run-time operation of each output computer program at its respective target computing device is consistent with the operation defined for that computing device within the input computer program. Advantageously, the developer may be shielded from numerous implementation details.

12 Claims, 35 Drawing Sheets

```
1   using System;
2   using Blackberry.Server;
3
4   /// <summary>
5   /// A simple server-side class used by the Math Demo device application to
6   /// perform mathimatical operations and return the results to the device.
7   /// </summary>
8   namespace Math_Demo
9   {
10      public class MathServerDemo : Blackberry.Server.Application
11      {
12          /// <summary>
13          /// Adds the values in the specified operation and returns
14          /// the result to the device.
15          /// </summary>
16          /// <returns>The result of the addition operation.</returns>
17          [Blackberry.Server.ServerRemoteMethod]
18          public static double Add(Operation op)
19          {
20              return (op.Left + op.Right);
21          }
22
23          /// <summary>
24          /// Subtracts the values in the specified operation and returns
25          /// the result to the device.
26          /// </summary>
27          /// <returns>The result of the subtraction operation.</returns>
28          [Blackberry.Server.ServerRemoteMethod]
29          public static double Subtract(Operation op)
30          {
31              return (op.Left - op.Right);
32          }
33
34          /// <summary>
35          /// Pushes the specified message to the specified device.
```

```
36   ///  </summary>
37   ///  <param name="message">The message to send.</param>
38   ///  <param name="devicePin">The PIN for the device to send to.</param>
39   public void PushMessage(string message, string devicePin)
40   {
41        // Create a device proxy instance to use for pushing
42        DeviceApplication device = new DeviceApplication();
43        device.AddPin(devicePin);
44
45        // Now simply call the device remote method
46        device.ShowMessage(message);
47   }
48        }
49
50   }
```

```
1    using Blackberry.Device;
2    using Blackberry.Device.Forms;
3
4    namespace Math_Demo
5    {
6        /// <summary>
7        /// Simple Math Demo application that allows the end user to
8        /// enter two values and ask the server to add or subtract
9        /// those values.
10       /// </summary>
11       public class MainForm : Blackberry.Device.Forms.Form
12       {
13           private void mnuExit_Click()
14           {
15               // Exit the application
16               Application.Exit();
17           }
18
19           private void AddValues_Click()
20           {
21               // Store the user specified operands in an Operation object
22               Operation op = new Operation();
23               op.Left = double.Parse(txtLeft.Text);
24               op.Right = double.Parse(txtRight.Text);
25
26               // Ask the server to add the values
27               MathServerDemo.Add(op);
28           }
29
30           private void SubtractValues_Click()
31           {
32               // Store the user specified operands in an Operation object
33               Operation op = new Operation();
34               op.Left = double.Parse(txtLeft.Text);
35               op.Right = double.Parse(txtRight.Text);
```

```
36        // Ask the server to subtract the values
37        MathServerDemo.Subtract(op);
38    }
39
40    #region Blackberry Form Parameters generated code
41    /// <summary>
42    /// Required code for Form parameter support - do not modify
43    /// the contents of this region with the code editor.
44    /// </summary>
45
46    public static void Show(){}
47    #endregion
48
49    #region Blackberry Form Designer generated code
50    /// <summary>
51    /// Required code for Designer support - do not modify
52    /// the contents of this region with the code editor.
53    /// </summary>
54
55    public static Blackberry.Device.Forms.MenuItem mnuAddValues;
56    public static Blackberry.Device.Forms.MenuItem mnuSubtractValues;
57    public static Blackberry.Device.Forms.MenuItem MenuItem1;
58    public static Blackberry.Device.Forms.MenuItem mnuExit;
59    public static Blackberry.Device.Forms.Label Label1;
60    public static Blackberry.Device.Forms.TextBox txtLeft;
61    public static Blackberry.Device.Forms.Label Label2;
62    public static Blackberry.Device.Forms.TextBox txtRight;
63    public static Blackberry.Device.Forms.Region Region1;
64    public static Blackberry.Device.Forms.Button btnAdd;
65    public static Blackberry.Device.Forms.Button btnSubtract;
66    #endregion
67  }
68 }
```

```
1   using Blackberry.Device;
2
3   /// <summary>
4   /// A class derived from Blackberry.Device.Application is the class where you can declare
5   /// global variables for the application as well as implement the application starting point
6   /// "Main()", Asynchronous callbacks for server method calls and remote methods to be
7   /// invoked by the server
8   ///
9   /// An instance of the Blackberry.Device.Application class is created as soon as the
10  /// application is launched on the device.  Only 1 Blackberry.Device.Application class can be
11  /// declared in your project
12  /// </summary>
13  namespace Math_Demo
14  {
15      public sealed class DeviceApplication : Blackberry.Device.Application
16      {
17          protected override void Main()
18          {
19              // Show the main screen
20              MainForm.Show();
21          }
22
23          /// <summary>
24          /// The callback method that the server calls after completing
25          /// a requests to add two values.
26          /// </summary>
27          /// <param name="result">The result of the server-side addition.</param>
28          [Blackberry.Device.Callback(typeof(MathServerDemo))]
29          public void Add(double result)
30          {
31              MessageBox.Show("Addition result = " + result.ToString());
32          }
33
34          /// <summary>
35          /// The callback method that the server calls after completing
```

FIG. 12A

```
36  /// a requests to subtract two values.
37  /// </summary>
38  /// <param name="result">The result of the server-side addition.</param>
39  [Blackberry.Device.Callback(typeof(MathServerDemo))]
40  public void Subtract(double result)
41  {
42      MessageBox.Show("Subtraction result = " + result.ToString());
43  }
44
45  /// <summary>
46  /// Exposed device method that can be called from the server
47  /// to display a message on the device.
48  /// </summary>
49  /// <param name="message"></param>
50  [Blackberry.Device.DeviceRemoteMethod]
51  public void ShowMessage(string message)
52  {
53      MessageBox.Show(message);
54  }
55
56  }
```

Lines 38–43 are bracketed as F (1200). Lines 45–53 are bracketed as G.

FIG. 12B

```
[Blackberry.Device.DeviceRemoteMethod]
public void ShowMessage(string message)
{
    Blackberry.Eventing.MessageSender sender = new Blackberry.Eventing.MessageSender(
        "Math_Demo", this.PinList, "ShowMessage", message);
    sender.Send();
}
```

```
1  <messages>
2    <message name="AddSoapIn" script="">
3      <field name="op" type="data" component="Operation" array="false" />
4      <alert beep="false" ribbon="false" />
5    </message>
6    <message name="AddSoapOut" script="Add">
7      <field name="parameters" type="decimal" array="false" />
8      <alert beep="false" ribbon="false" />
9    </message>
10   <message name="SubtractSoapIn" script="">
11     <field name="op" type="data" component="Operation" array="false" />
12     <alert beep="false" ribbon="false" />
13   </message>
14   <message name="SubtractSoapOut" script="Subtract">
15     <field name="parameters" type="decimal" array="false" />
16     <alert beep="false" ribbon="false" />
17   </message>
18   <message name="SubscribeShowMessage" script="ShowMessage">
19     <field name="body" type="data" component="DotNetFilter" array="false" />
20     <alert beep="false" ribbon="false" />
21   </message>
22   <message name="ShowMessageSoapOut" script="ShowMessage">
23     <field name="ID" type="string" array="false" />
24     <field name="parameters" type="string" array="false" />
25     <alert beep="false" ribbon="false" />
26   </message>
27 </messages>
```

```
1  function mnuExit_Click()
2  {
3      System.exit();
4  }
5
6  function AddValues_Click()
7  {
8      var op = Operation.create();
9      op.Left = parseFloat(MainForm.txtLeft.value);
10     op.Right = parseFloat(MainForm.txtRight.value);
11     AddSoapIn.op = op;
12     AddSoapIn.send();
13  }
14
15  function SubtractValues_Click()
16  {
17      var op = Operation.create();
18      op.Left = parseFloat(MainForm.txtLeft.value);
19      op.Right = parseFloat(MainForm.txtRight.value);
20      SubtractScapIn.op = op;
21      SubtractSoapIn.send();
22  }
23
24  function MainForm_init()
25  {
26  }
27
28  function Add()
29  {
30      var result = AddSoapOut.parameters;
31      Dialog.display("Addition result = " + result.toString());
32  }
33
34  function Subtract()
35  {
```

1700

```
36      var result = SubtractSoapOut.parameters;
37      Dialog.display("Subtraction result = " + result.toString());
38    }
39   function ShowMessage()
40   {
41     var message = ShowMessageSoapOut.parameters;
42     Dialog.display(message);
43   }
44
45   function Main()
46   {
47     if (!g_Subscribed)
48     {
49       var dotNetFilterObj = DotNetFilter.create("ShowMessage");
50       dotNetFilterObj.PIN = gDeviceInfo.PIN;
51       dotNetFilterObj.Method = "ShowMessage";
52       SubscribeShowMessage.body = dotNetFilterObj;
53       SubscribeShowMessage.send();
54       g_Subscribed = true;
55     }
56     MainForm.display();
57   }
58   function onError()
59   {
60     Dialog.display("An Error has occurred, " + Error.description + "\n" + Error.data);
61   }
62   function onExit()
63   {
64   }
65   }
66   }
67   }
68
```

FIG. 17B

```
36  //** Notification Methods
37      [SoapDocumentMethod(ParameterStyle=SoapParameterStyle.Bare)]
38      [WebMethod]
39      [return: XmlElement("string", Namespace="Math_Demo")]
40      public string ShowMessage()
41      {
42          return null;
43      }
44
45      [SoapDocumentMethod(ParameterStyle=SoapParameterStyle.Bare)]
46      [WebMethod]
47      [return: XmlElement("SubscribeResponse",
    Namespace="http://schemas.xmlsoap.org/ws/2004/08/eventing")]
48      public SubscribeResponse
    SubscribeShowMessage([System.Xml.Serialization.XmlElementAttribute(Namespace="http://sche
    mas.xmlsoap.org/ws/2004/08/eventing")] Subscribe Subscribe)
49      {
50          try
51          {
52              return SubscribeCommon(Subscribe);
53          }
54          catch (Exception e)
55          {
56              throw e;
57          }
58          finally
59          {
60          }
61      }
62
63      [SoapDocumentMethod(ParameterStyle=SoapParameterStyle.Bare)]
64      [WebMethod]
```

FIG. 18B

```
69   public void
70   UnsubscribeShowMessage([System.Xml.Serialization.XmlElementAttribute(Namespace="http://sc
71   hemas.xmlsoap.org/ws/2004/08/eventing")] Unsubscribe Unsubscribe)
72   {
73       try
74       {
75           UnsubscribeCommon(Unsubscribe);
76       }
77       catch (Exception e)
78       {
79           throw e;
80       }
81       finally
82       {
83       }
84   }
85
86   private void
87   UnsubscribeCommon([System.Xml.Serialization.XmlElementAttribute(Namespace="http://schemas
88   .xmlsoap.org/ws/2004/08/eventing")] Unsubscribe Unsubscribe)
89   {
90       try
91       {
92           // get the subscription ID
93           string subscriptionID = Unsubscribe.Any[0].InnerText;
94
95           // perform the Unsubscribe
96           SubscriptionManager.Unsubscribe(subscriptionID);
97       }
98       catch (Exception e)
99       {
100          throw e;
101      }
102  }
103
```

FIG. 18C

```
104      private SubscribeResponse
105  SubscribeCommon([System.Xml.Serialization.XmlElementAttribute(Namespace="http://schemas.x
106  mlsoap.org/ws/2004/08/eventing")] Subscribe Subscribe)
107      {
108          try
109          {
110              // retrieve the Filter from the Subscribe object
111              string filter = Subscribe.Filter.Any[0].InnerText;
112              // retrieve the delivery details from the Subscribe object
113              XmlNode[] delivery = Subscribe.Delivery.Any;
114
115              // create a Namespace manager
116              XmlNamespaceManager nsm = new XmlNamespaceManager(new NameTable());
117              nsm.AddNamespace("a",
118  "http://schemas.xmlsoap.org/ws/2004/08/addressing");
119              nsm.AddNamespace("w", "http://www.rim.net/wica/ag/ws-eventing-event-
120  sink");
121
122              // retrieve the Address node of the event sink
123              XmlNode addressNode =
124  delivery[0].SelectSingleNode("/a:Address/text()", nsm);
125              // retrieve the URL of the event sink
126              string notificationUrl = addressNode.InnerText;
127
128              // retrieve the Subscription Node - containing the Subscription Id
129              XmlNode subscriptionNode =
130  delivery[0].SelectSingleNode("/a:ReferenceProperties/w:MySubscription/text()", nsm);
131
132              // retrieve the Subscription Id
133              string clientSubscriptionID = subscriptionNode.InnerText;
134
135              // -----------------------------------
136              // perform the Subscription
137              // -----------------------------------
```

FIG. 18D

```
138              clientSubscriptionID =
139   SubscriptionManager.Subscribe(clientSubscriptionID, notificationUrl, filter);
140              // ------------------------------------------------------------
141
142              // Construct the Subscription Response
143              SubscribeResponse response = new SubscribeResponse();
144
145
146              EndpointReferenceType endpointReference = new
147   EndpointReferenceType();
148              endpointReference.Address = new AttributedURI();
149
150              ReferenceParametersType referenceParameters = new
151   ReferenceParametersType();
152              endpointReference.ReferenceParameters = referenceParameters;
153              XmlDocument doc = delivery[0].OwnerDocument;
154
155              // set the Subscription Id to the value passed-in by the client
156              XmlElement agSubscriptionInfoElement =
157   doc.CreateElement("gnnms3:MySubscription", "http://www.rim.net/wica/ag/ws-eventing-event-
158   sink");
159              agSubscriptionInfoElement.InnerXml = clientSubscriptionID;
160
161              // create subscription ID element of the event source
162              XmlElement subscriptionInfoElement =
163   doc.CreateElement("nse:Identifier", "http://schemas.xmlsoap.org/ws/2004/08/eventing");
164              subscriptionInfoElement.InnerXml = clientSubscriptionID;
165
166              XmlElement[] elements = new XmlElement[2];
167              elements[0] = agSubscriptionInfoElement;
168              elements[1] = subscriptionInfoElement;
169              referenceParameters.Any = elements;
170              endpointReference.Address.Value = null;
171              response.SubscriptionManager = endpointReference;
172
```

FIG. 18E

```
173              return response;
174          }
175          catch (Exception e)
176          {
177              throw e;
178          }
179          finally
180          {
181          }
182      }
183  }
184
185  /// <remarks/>
186  [System.Xml.Serialization.XmlTypeAttribute(Namespace="http://schemas.xmlsoap.org/ws/
187  2004/08/eventing")]
188  public class Unsubscribe
189  {
190
191      /// <remarks/>
192      [System.Xml.Serialization.XmlAnyElementAttribute()]
193      public System.Xml.XmlElement[] Any;
194
195      /// <remarks/>
196      [System.Xml.Serialization.XmlAnyAttributeAttribute()]
197      public System.Xml.XmlAttribute[] AnyAttr;
198  }
199
200  /// <remarks/>
201  [System.Xml.Serialization.XmlTypeAttribute(Namespace="http://schemas.xmlsoap.org/ws/
202  2004/08/eventing")]
203  public class SubscribeResponse
204  {
205
206      /// <remarks/>
207      public EndpointReferenceType SubscriptionManager;
```

FIG. 18F

```
208      /// <remarks/>
209      public string Expires;
210
211      /// <remarks/>
212      [System.Xml.Serialization.XmlAnyElementAttribute()]
213      public System.Xml.XmlElement[] Any;
214
215      /// <remarks/>
216      [System.Xml.Serialization.XmlAnyAttributeAttribute()]
217      public System.Xml.XmlAttribute[] AnyAttr;
218  }
219
220  /// <remarks/>
221  [System.Xml.Serialization.XmlTypeAttribute(Namespace="http://schemas.xmlsoap.org/ws/
222  2004/08/addressing")]
223  public class EndpointReferenceType
224  {
225
226      /// <remarks/>
227      public AttributedURI Address;
228
229      /// <remarks/>
230      public ReferencePropertiesType ReferenceProperties;
231
232      /// <remarks/>
233      public ReferenceParametersType ReferenceParameters;
234
235      /// <remarks/>
236      public AttributedQName PortType;
237
238      /// <remarks/>
239      public ServiceNameType ServiceName;
240
241      /// <remarks/>
242
```

FIG. 18G

```
243             [System.Xml.Serialization.XmlAnyElementAttribute()]
244             public System.Xml.XmlElement[] Any;
245
246             /// <remarks/>
247             [System.Xml.Serialization.XmlAnyAttributeAttribute()]
248             public System.Xml.XmlAttribute[] AnyAttr;
249         }
250
251         /// <remarks/>
252         [System.Xml.Serialization.XmlTypeAttribute(Namespace="http://schemas.xmlsoap.org/ws/
253     2004/08/addressing")]
254         public class AttributedURI
255         {
256
257             /// <remarks/>
258             [System.Xml.Serialization.XmlAnyAttributeAttribute()]
259             public System.Xml.XmlAttribute[] AnyAttr;
260
261             /// <remarks/>
262             [System.Xml.Serialization.XmlTextAttribute(DataType="anyURI")]
263             public string Value;
264         }
265
266         /// <remarks/>
267         [System.Xml.Serialization.XmlTypeAttribute(Namespace="http://schemas.xmlsoap.org/ws/
268     2004/08/addressing")]
269         public class ReferencePropertiesType
270         {
271
272             /// <remarks/>
273             [System.Xml.Serialization.XmlAnyElementAttribute()]
274             public System.Xml.XmlElement[] Any;
275         }
276
277         /// <remarks/>
```

FIG. 18H

```
278    [System.Xml.Serialization.XmlTypeAttribute(Namespace="http://schemas.xmlsoap.org/ws/
279    2004/08/addressing")]
280    public class ReferenceParametersType
281    {
282
283        /// <remarks/>
284        [System.Xml.Serialization.XmlAnyElementAttribute()]
285        public System.Xml.XmlElement[] Any;
286
287    }
288    /// <remarks/>
289    [System.Xml.Serialization.XmlTypeAttribute(Namespace="http://schemas.xmlsoap.org/ws/
290    2004/08/addressing")]
291    public class AttributedQName
292    {
293
294        /// <remarks/>
295        [System.Xml.Serialization.XmlAnyAttributeAttribute()]
296        public System.Xml.XmlAttribute[] AnyAttr;
297
298        /// <remarks/>
299        [System.Xml.Serialization.XmlTextAttribute()]
300        public System.Xml.XmlQualifiedName Value;
301
302    }
303    /// <remarks/>
304    [System.Xml.Serialization.XmlTypeAttribute(Namespace="http://schemas.xmlsoap.org/ws/
305    2004/08/addressing")]
306    public class ServiceNameType
307    {
308
309        /// <remarks/>
310        [System.Xml.Serialization.XmlAttributeAttribute(DataType="NCName")]
311        public string PortName;
312
```

```
313        /// <remarks/>
314        [System.Xml.Serialization.XmlAnyAttributeAttribute()]
315        public System.Xml.XmlAttribute[] AnyAttr;
316
317        /// <remarks/>
318        [System.Xml.Serialization.XmlTextAttribute()]
319        public System.Xml.XmlQualifiedName Value;
320
321    }
322    /// <remarks/>
323    [System.Xml.Serialization.XmlTypeAttribute(Namespace="http://schemas.xmlsoap.org/ws/
324  2004/08/eventing")]
325    public class FilterType
326    {
327
328        /// <remarks/>
329        [System.Xml.Serialization.XmlTextAttribute()]
330        [System.Xml.Serialization.XmlAnyElementAttribute()]
331        public System.Xml.XmlNode[] Any;
332
333        /// <remarks/>
334        [System.Xml.Serialization.XmlAttributeAttribute(DataType="anyURI")]
335        public string Dialect;
336
337        /// <remarks/>
338        [System.Xml.Serialization.XmlAnyAttributeAttribute()]
339        public System.Xml.XmlAttribute[] AnyAttr;
340
341    }
342    /// <remarks/>
343    [System.Xml.Serialization.XmlTypeAttribute(Namespace="http://schemas.xmlsoap.org/ws/
344  2004/08/eventing")]
345    public class DeliveryType
346    {
347
```

FIG. 18J

```
348      ///  <remarks/>
349      [System.Xml.Serialization.XmlTextAttribute()]
350      [System.Xml.Serialization.XmlAnyElementAttribute()]
351      public System.Xml.XmlNode[] Any;
352
353      ///  <remarks/>
354      [System.Xml.Serialization.XmlAttributeAttribute(DataType="anyURI")]
355      public string Mode;
356  }
357      ///  <remarks/>
358      [System.Xml.Serialization.XmlAnyAttributeAttribute()]
359      public System.Xml.XmlAttribute[] AnyAttr;
360
361  }
362      ///  <remarks/>
363      [System.Xml.Serialization.XmlTypeAttribute(Namespace="http://schemas.xmlsoap.org/ws/
364  2004/08/eventing")]
365  public class Subscribe
366  {
367
368      ///  <remarks/>
369      public EndpointReferenceType EndTo;
370
371      ///  <remarks/>
372      public DeliveryType Delivery;
373
374      ///  <remarks/>
375      public string Expires;
376
377      ///  <remarks/>
378      public FilterType Filter;
379
380      ///  <remarks/>
381      [System.Xml.Serialization.XmlAnyElementAttribute()]
382      public System.Xml.XmlElement[] Any;
```

FIG. 18K

```
383  /// <remarks/>
384  [System.Xml.Serialization.XmlAnyAttributeAttribute()]
385  public System.Xml.XmlAttribute[] AnyAttr;
386
387  }
388  }
```

```
36      <map:portType map:name="tns:Math_DemoSoap">
37        <map:operation map:name="Add">
38          <map:input map:component="AddSoapIn" />
39          <map:output map:component="AddSoapOut" />
40        </map:operation>
41        <map:operation map:name="Subtract">
42          <map:input map:component="SubtractSoapIn" />
43          <map:output map:component="SubtractSoapOut" />
44        </map:operation>
45        <map:operation map:name="ShowMessage">
46          <map:output map:component="ShowMessageSoapOut" />
47        </map:operation>
48      </map:portType>
49      <map:subscription>
50        <map:filter map:component="DotNetFilter" map:expression="PIN=%PIN%,Method=%Method%"
51   />
52        <map:notification map:component="ShowMessageSoapOut" />
53        <map:subscribe map:component="SubscribeShowMessage"
54   operation="SubscribeShowMessage" map:portType="tns:Math_DemoSoap" />
55        <map:unsubscribe map:operation="UnsubscribeShowMessage"
56   map:portType="tns:Math_DemoSoap" />
57      </map:subscription>
58    </map:wiclet>
59
```

FIG. 19B

METHOD AND MACHINE-READABLE MEDIUM FOR BUILDING DISTRIBUTED SOFTWARE

FIELD OF TECHNOLOGY

The invention relates to distributed systems, and more particularly to the creation of distributed software for distributed systems.

BACKGROUND

In the field of computer science, "distributed computing" generally refers to the co-ordinated use of physically distributed computing devices. The term "computing device" refers to any one of a wide range of devices having memory and a processor capable of executing instructions, such as a personal computer (PC), server, workstation, laptop computer, tablet computer, personal digital assistant (PDA), or wireless computing device for example. A system in which distributed computing occurs is referred to as a "distributed system", and the software which is executed by such a system is referred to as "distributed software." Distributed software may consist of multiple software components (e.g. distinct computer programs) which are intended for execution on multiple computing devices (possibly of different types) that intercommunicate, e.g. by way of a network. Distributed software may be used to solve a wide variety of computational tasks.

The World Wide Web is one example of a distributed system. When a person browses the World Wide Web using a Web browser application on an Internet-connected computer, that person is actually using a distributed system which includes the Internet-connected computer (for displaying Web page content), one or more Web servers (for hosting Web site content), and, in many cases, a proxy server (which may serve as a temporary repository for recently browsed Web pages). As the user browses from Web site to Web site, the computer executing the Web browser software communicates over the Internet via a system of routers (which may also be considered to be part of the distributed system) with Web server and/or proxy server software executing at remote computing devices, using the HyperText Transfer Protocol (HTTP) and Transmission Control Protocol/Internet Protocol (TCP/IP) protocols for example. The Internet-connected computer, Web server and proxy server may each be a different type of computing device. For example, the Internet-connected computer may be an iMac® G5 computer with a PowerPC™ G5 processor executing the Mac® OS X Tiger operating system, the Web server may be a Sun Fire™ V20Z Server with an AMD Opteron™ 200 processor executing the Sun Solaris 9 operating system, and the proxy server may be a Cisco® CE-510 Content Engine having an Intel® Pentium™ 4 processor.

Depending upon the type of computing devices which comprise a distributed system, a developer or team of developers that is tasked with developing or maintaining distributed software for that system may require training in a wide range of programming languages and computing device platforms. Each developer may further require training in respect of the communications scheme to be employed to facilitate communication between distributed system components. Such training is often time-consuming and costly.

BRIEF DESCRIPTION OF THE DRAWINGS

In the figures which illustrate example embodiments of this invention:

FIGS. 8A and 8B illustrate a portion of the source code for the computer program of FIG. 6;

FIGS. 11A and 11B illustrate yet another portion of the source code for the computer program of FIG. 6;

FIGS. 12A and 12B illustrate a further portion of the source code for the computer program of FIG. 6;

FIG. 15 illustrates a stub routine generated by the embodiment of FIG. 1;

FIG. 16 illustrates a portion of one of the computer programs of FIG. 14;

FIGS. 17A and 17B illustrates another portion of one of the computer programs of FIG. 14;

FIGS. 18A-18L illustrate an .asmx file which forms part of the distributed system of FIG. 5; and FIGS. 19A and 19B illustrate a mapping file which forms part of the distributed system of FIG. 5.

DETAILED DESCRIPTION

Figure 1:
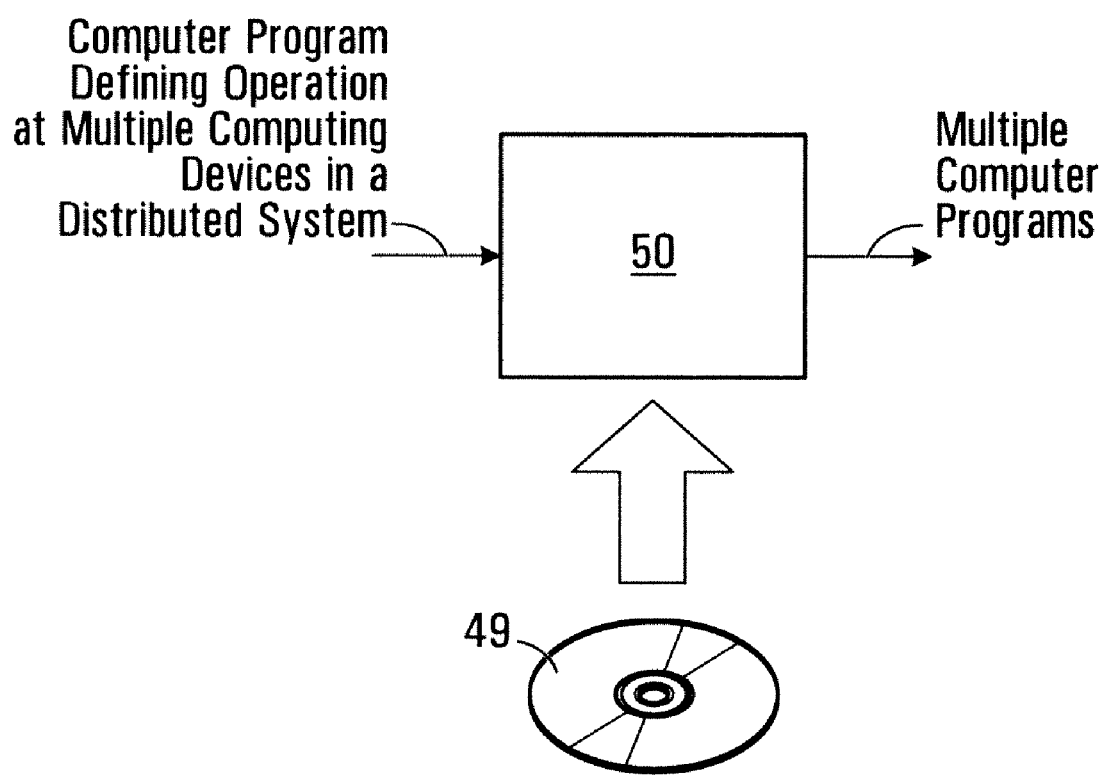
FIG. 1 is a block diagram illustrating an embodiment of the invention.

In overview, an embodiment of the present invention provides an improvement over conventional techniques for building distributed software for a distributed system. Traditionally, when distributed software is created, the software is authored as a number of distinct computer programs, each of which defines operation of a particular computing device, or type of computing device, within the relevant distributed system. If one of the computing devices has a distinct platform or is only capable of executing programs which are written in a certain programming language, the software developer may be required to learn to write programs for that platform or learn a new programming language, which introduces delay and additional cost. If it is necessary to remotely invoke a routine at one computing device at run time from another computing device, the computer program at the calling device will typically include expressly-coded instructions, in the form of a remote procedure call (RPC) or some other form of inter-process communication (IPC) mechanism (e.g. Simple Object Access Protocol, Remote Method Invocation, Component Object Model, Distributed Component Object Model, etc.) which is supported by the distributed system. The developer may be required to learn about this IPC mechanism in order to implement such remote invocations. When this work must be done in addition to coding the business logic of each computer program, the difficulty of a distributed software development project may be compounded.

The present embodiment seeks to relieve developers from the burden of developing multiple computer programs and expressly coding RPCs or other forms of IPC mechanisms.

In one aspect of the below-described embodiment, there is provided a computer-implemented method comprising: identifying a first set of routines in a computer program which define operation of a first computing device in a distributed system, a subset of the first set of routines being designated as remotely invokable at run time; further identifying a second set of routines in the computer program which define operation of a second computing device in the distributed system, the second set of routines including at least one direct call to a routine of the subset; and based on the first set of routines, the subset of the routines, and the second set of routines, creating: a first computer program, including routines which are functionally equivalent to the first set of routines, for execution by the first computing device; and a second computer program, including routines which are functionally equivalent to the second set of routines, for execution by the second computing device, wherein the at least one direct call to the routine of the subset is emulated with instructions for remotely invoking a functional equivalent of the routine within the first computer program by way of an inter-process communication mechanism supported by the distributed system.

In another aspect of the below-described embodiment, there is provided a computer-implemented method comprising: identifying a first set of routines in a computer program having a first common purpose, a subset of the first set of routines being designated as remotely invokable at run time; further identifying a second set of routines in the computer program having a second common purpose, the second set of routines including at least one direct call to a routine of the subset; and based on the first set of routines, the subset of the routines, and the second set of routines, creating: a first computer program, including routines which are functionally equivalent to the first set of routines, for execution by a first computing device of a distributed system; and a second computer program, including routines which are functionally equivalent to the second set of routines, for execution by a second computing device of the distributed system, wherein the at least one direct call to the routine of the subset is emulated with instructions for remotely invoking a functional equivalent of the routine within the first computer program by way of an inter-process communication mechanism supported by the distributed system.

In yet another aspect of the below-described embodiment, there is provided a machine-readable medium containing machine-executable code for creating distributed software, the machine-readable medium comprising: machine-executable code for identifying a first set of routines in a computer program which define operation of a first computing device in a distributed system, a subset of the first set of routines being designated as remotely invokable at run time; machine-executable code for further identifying a second set of routines in the computer program which define operation of a second computing device in the distributed system, the second set of routines including at least one direct call to a routine of the subset; and machine-executable code for creating, based on the first set of routines, the subset of the routines, and the second set of routines: a first computer program including routines which are functionally equivalent to the first set of routines for execution by the first computing device; and a second computer program including routines which are functionally equivalent to the second set of routines for execution by the second computing device, wherein the at least one direct call to the routine of the subset is emulated with instructions for remotely invoking a functional equivalent of the routine within the first computer program by way of an inter-process communication mechanism supported by the distributed system.

In yet another aspect of the below-described embodiment, there is provided a machine-readable medium containing code for creating distributed software, the machine-readable medium comprising: machine-executable code for creating, within a computer program which defines operation of a first computing device and which includes a direct call to a routine which defines operation of a second computing device, a stub routine having a same signature as the routine, the stub routine including instructions for remotely invoking the routine at the second computing device using an inter-process communication mechanism, such that when the computer program is executed at the first computing device and the direct call is made, the stub routine is invoked.

In yet another aspect of the below-described embodiment, there is provided a machine-readable medium containing code for execution at a computing device for creating distributed software, the machine-readable medium comprising: machine-executable code for identifying a first set of routines in a computer program having a first common purpose, a subset of the first set of routines being designated as remotely invokable at run time; machine-executable code for further identifying a second set of routines in the computer program having a second common purpose, the second set of routines including at least one direct call to a routine of the subset; and machine-executable code for creating, based on the identified first set of routines, the subset of the routines, and the second set of routines: a first computer program including routines which are functionally equivalent to the first set of routines for execution by a first computing device of a distributed system; and a second computer program including routines which are functionally equivalent to the second set of routines for execution by a second computing device of the distributed system, wherein the at least one direct call to the routine of the subset is emulated with instructions for remotely invoking a functional equivalent of the routine within the first computer program by way of an inter-process communication mechanism supported by the distributed system.

An embodiment of the invention may take the form of a software tool 50 (see FIG. 1). The tool 50 receives as its input a single computer program (i.e. a set of instructions defining the behaviour of a computing device, which may for example be in the form of source code, byte code, object code or machine code) and generates therefrom multiple computer programs which constitute distributed software for a distributed system. The computer program that is input by the tool 50 includes distinct sets of routines which define the operation of distinct computing devices (or types of computing devices) in the distributed system. By allowing the distinct sets of routines to be defined in a single computer program, development is simplified in at least two ways. First, the developer may use a single, familiar programming language and a familiar software development environment to write the program. Second, direct calls may be made between routines, even if they define operation at distinct computing devices. This permits a software developer to focus on the business logic of the distributed software rather than operational details of each computing device in the distributed system or the IPC mechanism(s) used for communication between computing devices within the distributed system.

Upon receiving the input computer program, the tool 50 essentially separates the sets of routines into distinct computer programs which are output for deployment to and execution by the distinct computing devices comprising the distributed system. The tool 50 inserts any necessary instructions into the generated computer programs for permitting the computer programs to intercommunicate within the distributed system. In the result, the run-time operation of each output computer program at its respective target computing device is equivalent to (i.e. consistent with) the operation defined for that computing device within the input computer program. Advantageously, the developer has been shielded from numerous implementation details.

If a target computing device within the distributed system requires that a computer program be written in a particular programming language for operation, the tool 50 may automatically translate the routines which define operation at that computing device into a suitable programming language within the output computer program. As a result, the costs associated with learning a different programming language can be avoided.

Regardless of whether translation is performed, the computer programs generated by the tool 50 will be functionally equivalent (i.e. will achieve the same ends as) the corresponding routines in the input computer program.

Some embodiments of the invention may also permit data structures to be defined once and shared between computing devices in the distributed system—even devices of different types (e.g. having different processors or operating systems)—so that such data structures may be passed as parameters in direct method calls between sets of routines. This prevents the developer from having to implement the same logical data structure in multiple programs or languages.

In some embodiments, the definition of each set of routines in the input computer program may be based on commonality of purpose or logically cohesive functionality (e.g. a first set of routines only contains routines which perform accounting functions, while a second set of routines only contains routines which perform inventory functions) rather than the identity of the computing device for which operation is defined. In such embodiments, the number of output programs may be based on a compile-time determination of the identity of the computing device at which each set of routines will be executed. For example, if two or more sets of routines are to be executed at the same computing device, a single output computer program may be created for those two or more sets of routines.

The tool 50 may be implemented in the form of an Integrated Development Environment (IDE) which has been programmed to perform the separation and other steps described above. As is known in the art, an IDE is a workbench for developing software, possibly featuring such facilities as symbolic debugging, version control, and data-structure browsing. Examples of IDEs include Visual Studio® NET, Metrowerks™ CodeWarrior™, and IDEs developed using the Eclipse open-source, platform-independent software framework. The IDE may be used in a conventional manner to author the input computer program, and when the developer builds the program, the IDE may automatically create multiple computer programs as described above in a "post-build" process. Distributed system-specific details such as the operative IPC mechanism are pre-programmed into the IDE, so that the developer need not be concerned with them. The IDE may invoke a commercially available code translation program if code translation is necessary.

Alternatively, if the developer does not employ an IDE for code development, and instead uses more manual techniques such as a standard text editor to author code, the tool 50 may take the form of a stand-alone computer program or utility into which source code files and/or compiled versions of the files are input. The steps performed by the stand-alone program or utility would essentially be the same as the post-build steps performed by an IDE.

Regardless of whether or not the tool 50 is implemented as an IDE, machine-executable code governing operation of the tool 50 may be loaded into a computing device comprising tool 50 from a machine-readable medium 49, which may be a removable optical disk, a Read Only Memory (ROM) chip, a magnetic storage medium, or the like.

Figure 2:
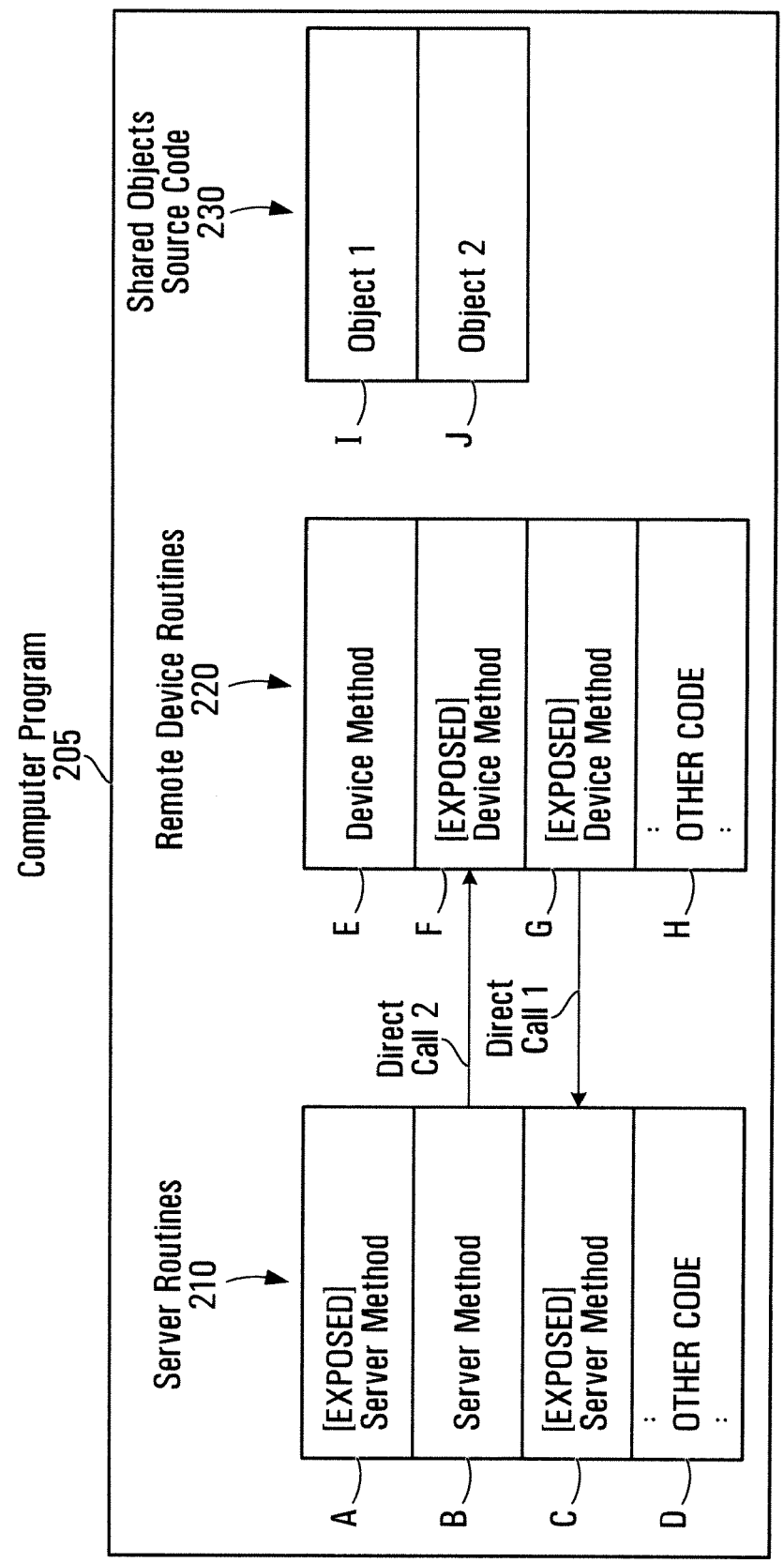
FIG. 2 is a block diagram illustrating a computer program which may serve as input to the embodiment of FIG. 1.
Figure 3:
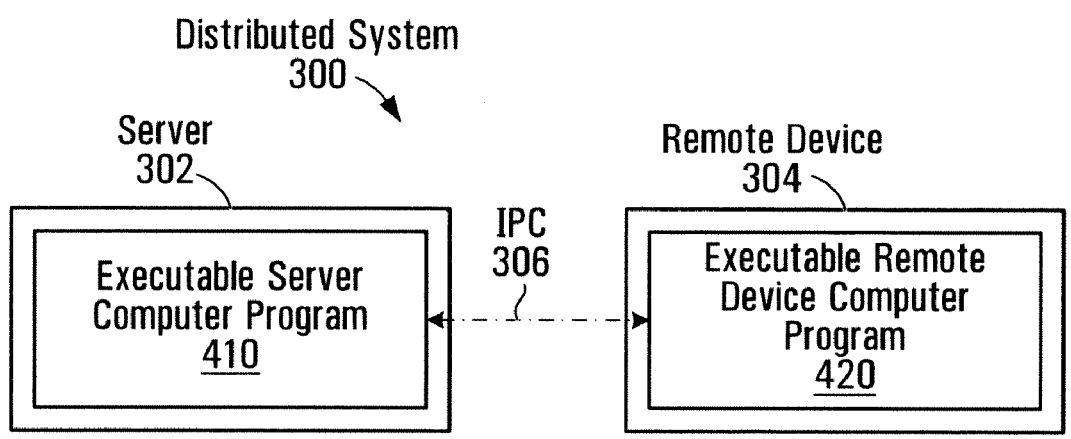
FIG. 3 is a block diagram illustrating a simple distributed system for which distributed software may be created by the embodiment of FIG. 1.
Figure 4:
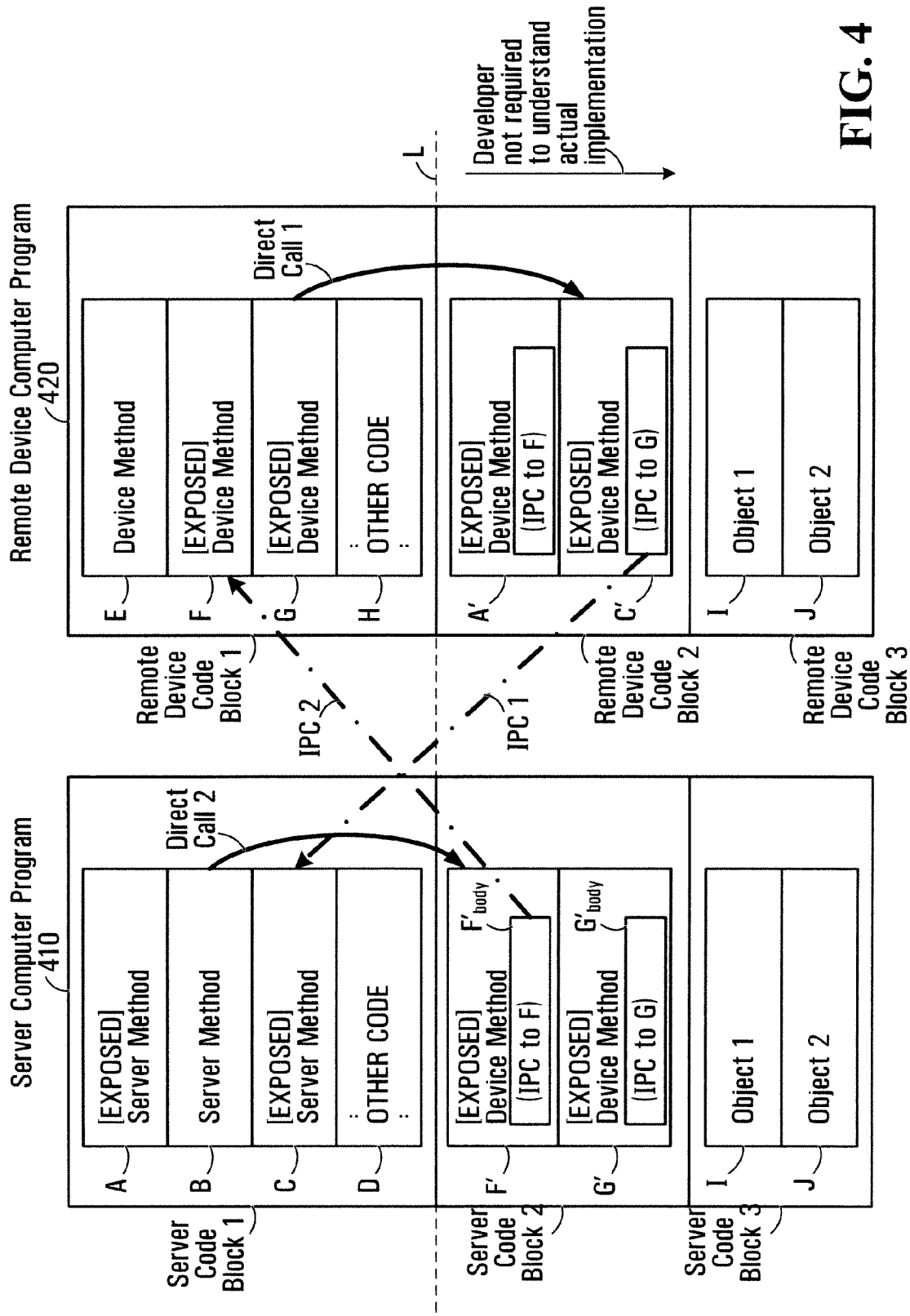
FIG. 4 is a block diagram illustrating a first and second computer program which may be generated from the computer program of FIG. 2.

FIGS. 2-4 are block diagrams which illustrate an exemplary embodiment for building distributed software at a high level. The embodiment illustrated in FIGS. 2-4 is intended to be generic in nature, and is not limited to a particular type of distributed system, software development environment, programming language, computing device or platform. The source code of FIGS. 2-4 is assumed to be object-oriented. This is for consistency with a later-provided, more specific example which is in fact authored in an object-oriented programming language. The invention should not be understood to be limited to object-oriented programming languages however.

FIG. 2 is a block diagram illustrating an exemplary computer program 205 which may be converted by tool 50 into multiple computer programs which constitute the distributed software for a distributed system. FIG. 2 illustrates the manner in which the computer program 205 is authored to permit the tool 50 to generate distributed software therefrom.

In the example illustrated in FIGS. 2-4, the target distributed system is a simple distributed system 300, which is illustrated in FIG. 3. The distributed system 300 comprises two computing devices—a server 302 and a remote device 304—which are capable of intercommunication over a network using a commonly understood communications protocol (e.g. TCP/IP over Ethernet or some other protocol, the details of which are unimportant for the purpose of the instant high-level overview). FIG. 3 is described below in more detail.

Referring back to FIG. 2, the computer program 205, which is represented in source code form, includes two sets of routines: server routines 210 and remote device routines 220. The program 205 also includes shared object source code 230.

Server routines 210 define operation of a first computing device within the distributed system 300 (FIG. 3), namely server 302. The server routines 210 are defined so as to indicate that the routines form a first logical set of routines which defines operation for the server 302. The physical manifestation of the logical set may differ depending upon the operative programming language, IDE, computing device platform or distributed system. In the case of an object-oriented language, each set of routines associated with a particular computing device (or type of computing device) may be defined in a single class (e.g. a "server class"), with each routine being a method of the class. Alternatively, the set of routines may be defined in multiple classes which have a common base class. For alternative embodiments implemented using a non-object-oriented language, specified methods could be grouped into distinct source files. For instance, a developer could specify methods using JavaScript in multiple ".js" files. The IDE may mark these files into logical groups similar to classes in an object-oriented language. The developer will be aware of the operative approach for distinguishing different sets of routines.

In the example illustrated in FIG. 2, a subset of server routines, i.e. methods A and C, is designated as remotely invokable at run time. A remotely invokable routine is one which, at run time, is resident at one computing device of a distributed system, yet is invokable from another computing device within the distributed system. Such remotely invokable routines are referred to as "exposed" routines. When a developer designates a routine as exposed, the developer is free to invoke that routine by a direct call from anywhere in the input computer program 205, even if the call is made from a set of routines defining operation of a computing device which is distinct from the device which will ultimately host the called routine. As is known in the art, a direct call is an invocation of a routine in a computer program from elsewhere within the same program. A direct call usually results in such run-time steps as storing the current stack frame, initializing a new stack frame for the routine to be invoked, and performing a jump statement to transfer control to the routine. In conventional direct calls, the calling code and the called routine will both reside in the same executable image. However, as indicated above, in the present case the calling code may end up in an executable image at a first computing device while the called routine is situated within another executable image at a second computing device. Direct calls are normally not made between routines which reside at distinct computing devices at run time, since the processor of a calling computing device is normally incapable of accessing and executing instructions that are part of a physically distinct executable image on a remote computing device (e.g. due the lack of run-time information on the part of the calling device regarding the relative location within the remote device's memory of the routine to be invoked, and due to the fact that, even if the relevant memory address were known, direct access to the memory of a remote device is not routinely available). As will be appreciated, however, in the present embodiment, the tool 50 of FIG. 1 automatically "replaces" direct calls using instructions which emulate the desired remote invocation using a suitable IPC mechanism, to create the illusion that direct method calls do in fact occur as coded.

An exemplary direct call to server method C from a second set of routines, namely remote device routines 220 (and specifically, from remote device method G), is illustrated at "Direct Call 1" of FIG. 2. The direct call is represented using a solid line arrow from the caller to the called routine. In the source code for remote device method G, the direct call may take the form "ServerClassName.ServerMethodName(<parameters>)".

Server routines 210 include other methods, such as server method B, which are not designated as exposed, e.g. because they only serve a purpose that is local to the server 302. Such methods need not, and indeed will not, be remotely invokable from remote device routines 220 at run time, as the remote device routines will not be aware of the existence of such methods at run time. Server routines 210 may further include other code D (e.g. other classes/methods).

Referring now to remote device routines 220, these routines define operation of a second computing device within the distributed system 300 (FIG. 3), namely the remote device 304. Remote device routines 220 include three exemplary remote device methods (or simply "device methods") E, F, and G, which may be defined in a single class or in multiple classes. Device methods F and G are designated as exposed methods. An exemplary direct call to exposed device method F from server side code is illustrated at "Direct Call 2" of FIG. 2. Method E is not designated as exposed and is therefore not invokable from server source code 210 in the illustrated embodiment. Remote device source code 220 further includes other source code H, which may take the form of other classes.

Shared object source code 230 is used to define objects (e.g. types or classes) which the developer wishes for server routines 210 and remote device routines 220 to each understand. A primary motivation for defining such shared objects is to permit the objects to be defined once for automatic implementation in each of the computer programs output by the tool 50. This permits the objects to be passed as parameters or as return results of exposed server routines or exposed remote device routines at run time.

A detailed description of FIG. 3 is deferred until FIG. 4 has been described, as FIG. 3 will be more readily understood once the roles of the components illustrated therein are described with reference to FIG. 4.

Referring to FIG. 4, a block diagram illustrating first and second computer programs 410 and 420 generated by the tool 50 of FIG. 1 from the input computer program 205 of FIG. 2 is shown. Server computer program 410 is for deployment to and execution by the server 302 while remote device computer program 420 is for deployment to and execution by the remote device 304 (FIG. 3). The computer programs 410 and 420 may be in any form (e.g. source code, byte code, object code or executable code). Collectively, the two programs 410 and 420 constitute the distributed software of distributed system 300.

Server computer program 410 is made up of three code blocks, namely, server code blocks 1, 2 and 3. The term "code block" is used herein to refer to a portion of a computer program which contains code having a common or similar purpose.

Server code block 1 is represents instructions which have been created through conventional compilation of the server routines 210 of FIG. 2. Server code block 1 accordingly includes compiled versions of each of methods/source code A, B, C and D. For consistency, the code in FIG. 4 is labelled using the same identifiers A, B, C and D as are used in FIG. 2, even through the code in FIG. 4 is compiled code as opposed to source code.

Server code blocks 2 and 3, on the other hand, each represent compiled code which the tool 50 of FIG. 1 has automatically generated during the build process, transparently from the perspective of the developer. For clarity, the term "build" as used herein, in addition to referring to traditional build operations such as compilation and linking, may further refer to "post-build" processing not conventionally considered to be part of the software build process, such as performing reflection against compiled code and manipulating code after compilation but before execution.

Server code block 2 constitutes stub routines which have been automatically created for purposes of allowing the server computer program 410 to remotely invoke exposed methods at the remote device 304. The term "stub routine" (or simply "stub") refers to a routine whose signature (i.e. name and parameters) is the same as, but whose body is different from, an exposed routine which, in its executable form, is deployed to a different computing device within the distributed system than the stub. Server code block 2 includes one stub method for each remote device method which has been designated as exposed. The body of each stub routine includes instructions for remotely invoking the corresponding exposed routine using an IPC mechanism (e.g. Web Services Eventing, Remote Method Invocation (RMI), Component Object Model (COM), Distributed COM (DCOM etc.) supported by the distributed system 300. Each stub routine is created automatically by the tool 50, e.g., by copying the method to be remotely invoked, replacing its body with instructions for remotely invoking the method (based on a pre-programmed understanding of the IPC mechanisms used in the distributed system 300), and compiling of the result for example.

Two stubs F' and G' are shown in server code block 2. These two stubs correspond to the exposed remote device methods F and G of remote device computer program 420 (described below). The same letters are used to identify stubs as are used to identify their corresponding remote methods, with a """ (prime symbol) signifying a stub routine. The stub method bodies $F'_{body}$ and $G'_{body}$ of stubs F' and G' include instructions which result in the run-time, remote invocation (again, via a suitable IPC mechanism) of the corresponding exposed methods F and G at remote device 304. The stubs form part of the server computer program 410, so that any direct method calls to methods F and G as originally authored by the developer within server code block 1 can remain within the computer program 410. In actuality, the direct method calls to methods F and G invoke the relevant stub, not the corresponding method. In turn, the stub body uses inter-process communication to cause method F or G to be remotely executed.

For example, as shown in FIG. 4, Direct Call 2 to method F within server method B actually invokes local stub F'; in turn, $F'_{body}$ is executed, resulting in inter-process communication IPC2 between the stub F' and actual method F at the remote device 304, which remotely invokes the method F. In FIG. 4, inter-process communication is illustrated as a "dot-dash" arrow from the caller to the called code.

The tool 50 may create stubs for all remote exposed methods, or only ones that are actually invoked.

Server code block 3 of computer program 410 represents the shared object source code 230 of FIG. 2 after compilation. Server code block 3 contains representations of the objects I and J defined in source code 230 of FIG. 2. The representations may be transformations of objects I and J into a format that permits the program 410 to use the operative IPC mechanism to pass or receive them as parameters to or from remote computer program 420.

In FIG. 4, server code blocks 2 and 3 are separated from server code block 1 by a dashed line L. Line L is a notional separator of code whose implementation the developer is required to understand (appearing above the line) from code whose implementation the developer is not required to understand (appearing below the line). Code appearing above line L (i.e. server code block 1) will be understood by the developer because the code will have been authored by the developer. In contrast, code appearing below the line (i.e. server code blocks 2 and 3) may not be understood by, or even known to, the developer, because the code has been automatically generated by tool 50 (FIG. 1) during the build process, possibly without the developer's knowledge. For example, server code block 2 may not be understood because the developer may not be aware of the IPC mechanism that is employed for intercommunication between computing devices 302 and 304 in the distributed system 300. Moreover, the developer may not appreciate the fact that objects I and J of server code block 3 may have been transformed from their original form to facilitate the passing of objects I and J to or from the server 302 (FIG. 3). However this lack of understanding can be advantageous from the perspective of the developer, in the sense that the apparent direct remote method calls "simply work", without any need for learning or manual coding of the system-specific details by the developer.

It is noted that executable server code 410 does not include any remote device code, except for the automatically created device method stubs in server code block 2 (which may or may not be properly considered to be remote device code). This illustrates the separation of routines into distinct computer programs that is effectively performed by the tool 50 of the present embodiment.

It is further noted that, in creating the server program 410, the tool 50 automatically provides a "framework" for server code blocks 1, 2 and 3 which results in a distinct computer program. For example, the framework may include any of a "main" routine, "Begin" and "End" statements, inclusion of basic support routines from appropriate libraries, and the like. The requirements for creating a distinct computer program will depend upon the technology used to generate the program. In the case of an executable user application, a standard entry point to the application (e.g. a main method) may need to be defined. In the case of a Web service or ASP.NET Web application, a proper entry point for the Microsoft® Internet Information Server (IIS) may need to be provided in the form of implementing a standard interface. Those skilled in the art will appreciate that the framework required to create a computer program is highly system dependent, and may depend upon such factors as the operative programming language, platform and distributed system.

Remote device computer program 420 of FIG. 4 is essentially a mirror image of server program 410. Program 420 is made up of three code blocks, namely, remote device code blocks 1, 2 and 3, which are analogous to server code blocks 1, 2 and 3. Remote device code blocks 1, 2 and 3 are created within a framework which results in a distinct remote device computer program 420. The framework is automatically created by the tool 50, as described above.

Remote device code block 1 is executable code which has been created through conventional compilation of the authored remote device routines 220 of FIG. 2. In the illustrated example, remote device code block 1 includes compiled versions of each of methods/source code E, F, G and H of FIG. 2, which are is labelled using the same identifiers for consistency.

Remote device code block 2 is made up of stubs for each exposed server method. Specifically, two stubs A' and C' are included in remote device code block 2. These two stubs correspond to exposed server methods A and C. Stubs A' and C' have method bodies $A'_{body}$ and $C'_{body}$ respectively, whose operation is analogous to the previously described method bodies $F'_{body}$ and $G'_{body}$. For example, as shown in FIG. 4, device method G directly invokes stub C' via Direct Call 1; in turn, $C'_{body}$ is executed, resulting in inter-process communication IPC1 between the stub C' and method C, which causes the latter method to be executed at the server 302.

Like server code block 3, remote device code block 3 includes representations of the shared object source code 230 of FIG. 2 after compilation. This permits the remote device computer program 420 to receive or pass parameters of type I and J to or from the server program 410.

The dashed line L through remote device program 420 separates code whose implementation is understood by the developer from code whose implementation is not necessarily understood by the developer, in the same way as it does for server program 410.

It is noted that the executable remote device program 420 does not include any server code except for the automatically created server method stubs in device code block 2 (which may not be properly considered to be server code). This again illustrates the separation of input computer program 205 (FIG. 2) into distinct computer programs which is performed by the tool 50.

Referring back to FIG. 3, a block diagram illustrating the distributed system 300 following code deployment is shown. FIG. 3 shows computer program 410 (FIG. 4) after deployment to server 302 and remote device computer program 420 after deployment to remote device 304. Upon execution of these programs, the distributed software will appear to operate as authored, while in fact, inter-device direct method calls are effected through system-dependent IPC 306 (such as IPC calls 1 and 2 of FIG. 4).

For clarity, it is noted that the terms "server" and "remote device" as used in FIGS. 2-4 should not be understood to limit use of the illustrated approach to computing devices that are conventionally referred to as "servers" or "remote devices". As will be seen, these terms are used for consistency with subsequent FIGS. 5-14 (described below), in which a more specific example is provided where the computing devices actually are a server and a remote device. In other words, the server 302 and remote device 304 of FIG. 3 could be any type of computing device.

The description which accompanies FIGS. 2-4 is useful for purposes of illustrating the present embodiment at a high level. However, a potentially significant complication in some embodiments may be the fact that different computing devices within the relevant distributed system employ vastly different processors, platforms or programming languages. In such distributed systems, the process of separating a computer program into multiple computer programs that the distributed system will be capable of executing may require special processing, such as a translation of code into a different programming language. Another potential problem is that, in the case where one of the computing devices is a wireless device, communication with that device may be intermittent, e.g. as the device moves between wireless coverage areas. In this case the generated distributed software may need to account for long delays between a time at which a remote method or function is invoked and the time at which a response is communicated to the caller. Preferably a computing device that is awaiting receipt of a response should not be blocked, i.e., should be free to engage in other processing while it waits.

To illustrate how these situations may be handled, an exemplary embodiment will now be described in which the two computing devices that comprise the distributed system employ different processors, platforms and programming languages, and wherein one of the devices is a wireless device. This embodiment is illustrated in FIG. 5.

Figure 5:
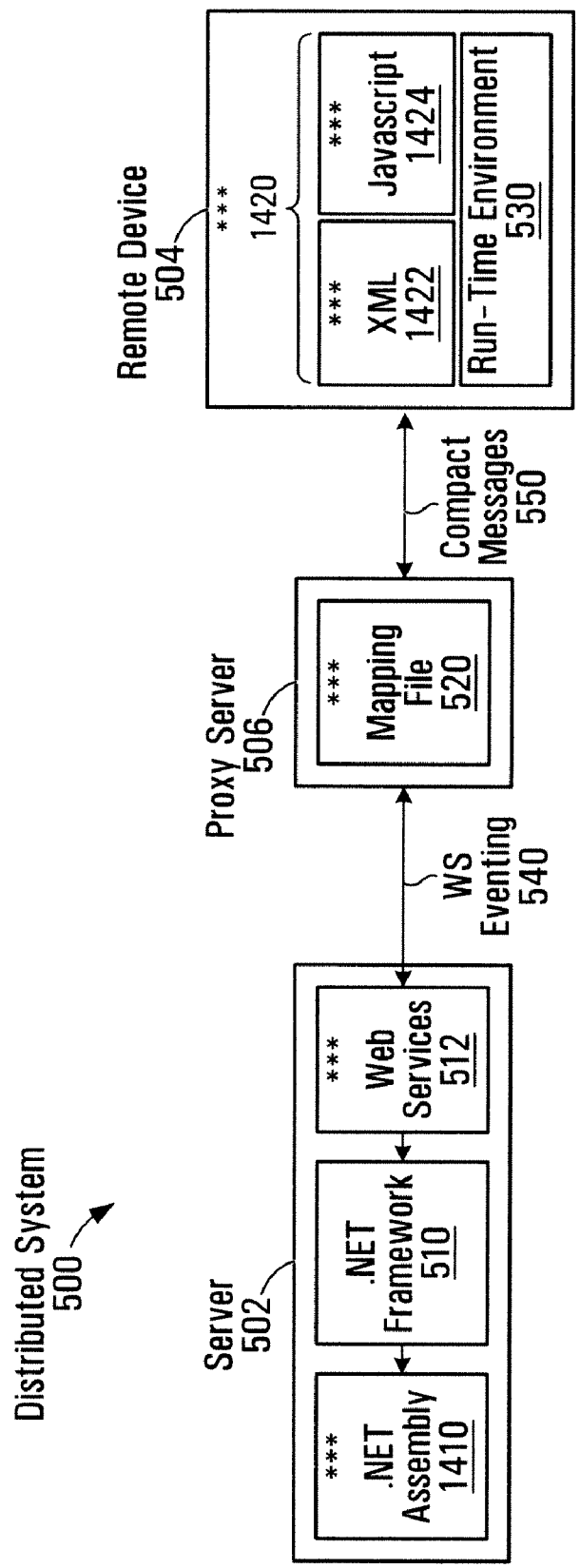
FIG. 5 is a block diagram illustrating an alternative distributed system for which distributed software may be created by the embodiment of FIG. 1.

FIG. 5 illustrates a distributed system 500 comprising two computing devices, namely, a server 502 and a remote device 504 (also referred to as a "wireless computing device" or "mobile device"). The server 502 may be a conventional server, employing an Intel® Pentium™ series processor for example, which executes a .NET framework 510. As is known in the art, a .NET framework is analogous to a Java™ virtual machine, and is included in the Visual Studio .NET IDE. The remote device 504 is a two-way wireless communications device (e.g. having email, phone and browser applications), which executes a run-time environment 530 (described below). These two computing devices 502 and 504 intercommunicate via an intermediary computing device referred to as a proxy server 506 according to a proprietary scheme as set forth in US application no(s). U.S. patent application Ser. No. 11/107,913 entitled SYSTEM AND METHOD FOR GENERIC DATA MAPPING BETWEEN WIRELESS COMPONENT APPLICATIONS AND APPLICATION DATA SOURCES filed on 18 Apr. 2005, now issued as U.S. Pat. No. 7,586,926; U.S. patent application Ser. No. 10/778,547 entitled SYSTEM AND METHOD OF COMPACT MESSAGING IN NETWORK COMMUNICATIONS BY REMOVING TAGS AND UTILIZING PREDEFINED MESSAGE DEFINITIONS filed on 17 Feb. 2004, now issued as U.S. Pat. No. 7,448,043; U.S. patent application Ser. No. 10/788,490 entitled SYSTEM AND METHOD FOR BUILDING WIRELESS APPLICATIONS WITH INTELLIGENT MAPPING BETWEEN USER INTERFACE AND DATA COMPONENTS filed on 1 Mar. 2004, now published under Publication No. 2005/0057560 A1; U.S. patent application Ser. No. 11/345,328 entitled SYSTEM AND METHOD FOR CREATING A MAPPING DOCUMENT FOR BINDING MESSAGES BETWEEN AN APPLICATION AND AN ASSOCIATED BACKEND SERVER filed on 2 Feb. 2006 now published under Publication No. 2006/0235928 A1; and U.S. patent application Ser. No. 11/076,054 entitled SYSTEM AND METHOD FOR BUILDING A DEPLOYABLE COMPONENT BASED APPLICATION filed on 10 Mar. 2005, now published under Publication No. 2006/0206890 A1, which are hereby incorporated by reference hereinto. The purpose of the exemplary distributed system 500 is to present a server-based application at the remote wireless device 504.

Figure 6:
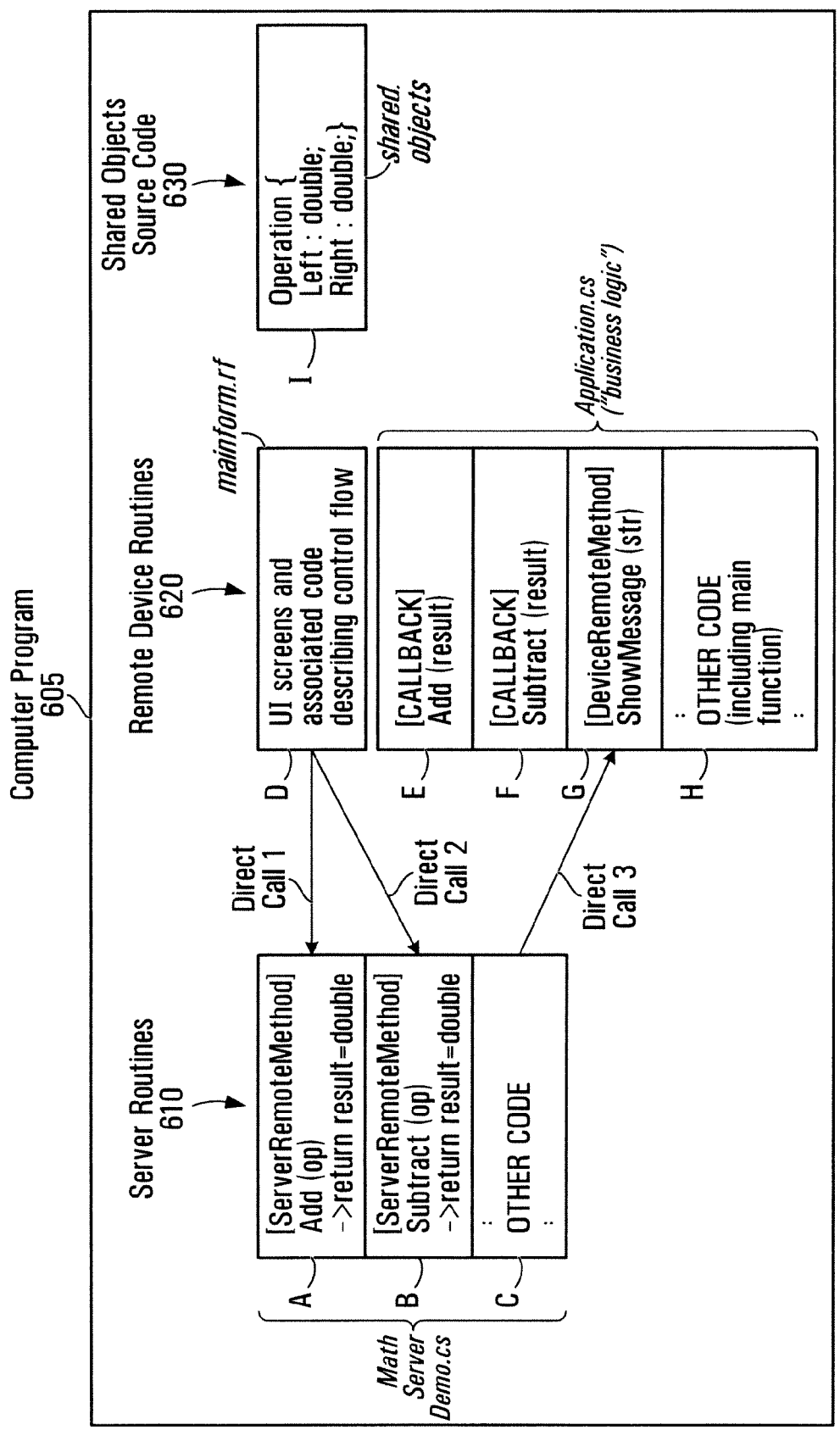
FIG. 6 is a block diagram illustrating another computer program which may serve as input to the embodiment of FIG. 1.
Figure 14:
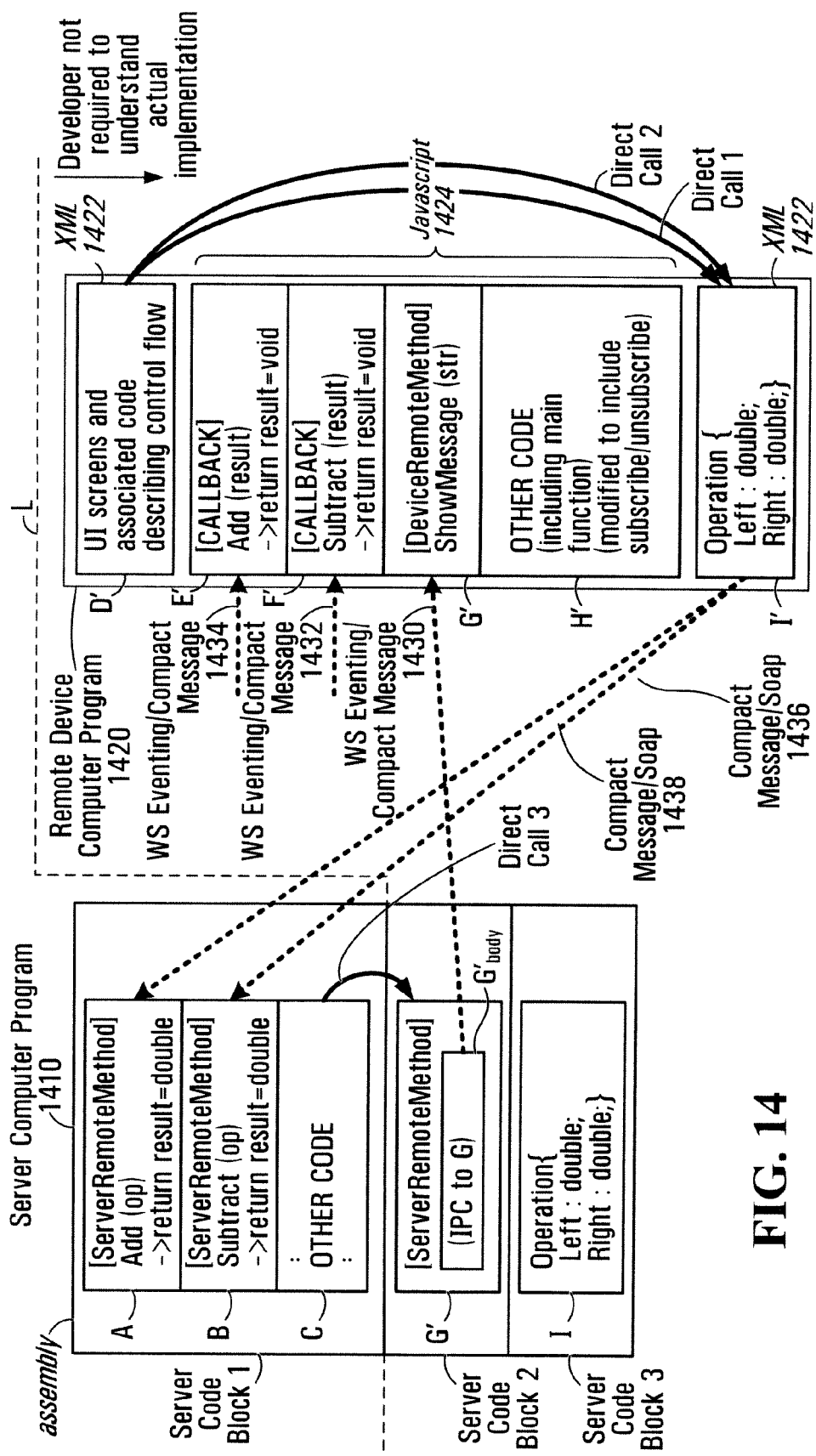
FIG. 14 is a block diagram illustrating a first and second computer program which may be generated from the computer program of FIG. 6.
Figure 18A:
Figure 19A:

The description of the other components in FIG. 5 will be deferred until FIGS. 6 and 14 are described, as the description accompanying FIGS. 6 and 14 will promote a better understanding of these components.

For simplicity, the building of distributed software for execution by the distributed system 500 from a simple input computer program 605 (FIG. 6), referred to as the "Math Demo" application, will be described. Briefly, the Math Demo application represents a simple distributed system in which a user of remote device 504 is presented with a single user interface (UI) screen having fields into which two numbers may be entered, along with "add" and "subtract" buttons. When either of the buttons is selected, an appropriate method for performing the appropriate mathematical operation is invoked at the server 502, and the result is communicated back to the remote device 504 for display.

It is noted that FIGS. 6 and 14 follow the conventions used in FIGS. 2 and 4 respectively.

Referring to FIG. 6, a block diagram of a software developer's world view when authoring source code for the above-described exemplary embodiment is shown. FIG. 6 is analogous to FIG. 2 except that it is specific to the "Math Demo" application and provides implementation details not shown in FIG. 2, such as the manner in which certain source code components are apportioned among electronic source code files in the exemplary embodiment.

As illustrated, the computer program 605 includes two sets of routines: server routines 610 and remote device routines 620. The program 605 also includes shared object source code 630. In the present embodiment, all of these components are authored in the programming language C# using the Microsoft® Visual Studio.NET IDE. It will be appreciated, however, that other programming languages and other IDE's could be used in alternative embodiments.

Figure 7:
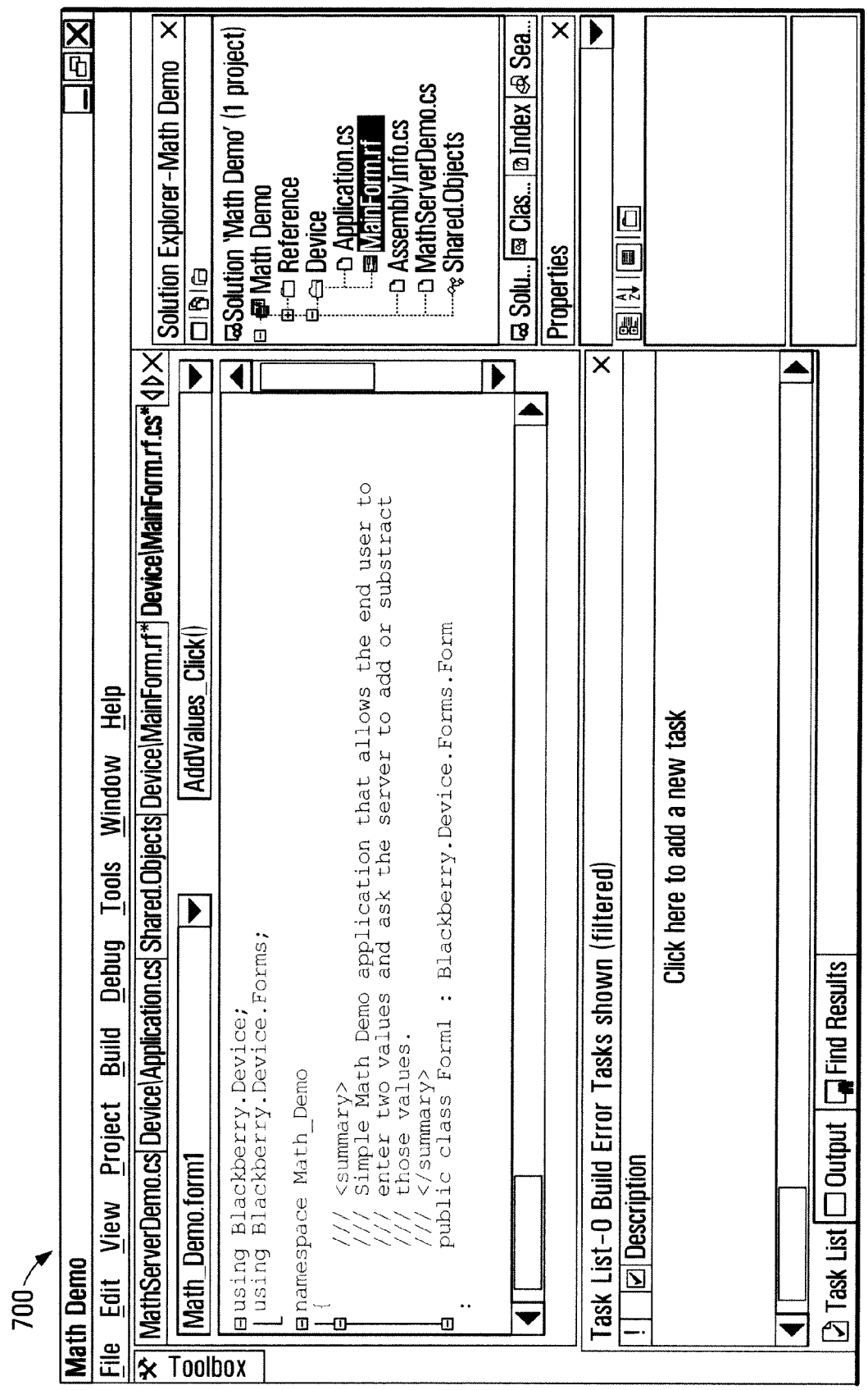
FIG. 7 is a screen shot illustrating a graphical user interface (GUI) of an integrated development environment (IDE) which may be used to create the computer program of FIG. 6.

The Visual Studio® .NET GUI which is used to author the code is illustrated at 700 in FIG. 7. The illustrated GUI is governed by a Visual Studio® .NET project type called BlackBerry.NET, which has been pre-programmed with knowledge of the target distributed system 500 to perform the post-build processing described herein. Notably, the project type hosts server code and remote device source code within a single computer program, along with a Shared Object editor which is used to define objects which may be passed between the server and the remote device at run time. Documentation regarding .NET projects is provided at URL msdn.microsoft-.com/library/default.asp?url=/library/en-us/cscon/html/vcurfcprojectpropertypages.asp, which is hereby incorporated by reference hereinto.

Server routines 610 of FIG. 6 define operation at the server 502 (FIG. 5). In the present embodiment, the routines 610 are methods in one or more classes. The developer may specify that the routines define operation at the server 302 by declaring the classe(s) to be an instance of a server base class. A server base class is simply a base class from which other classes are derived in order to indicate to the IDE that the classes contain code destined for the server. In some embodiments, this base class may have standard implemented methods and attributes. As illustrated in FIG. 6, all of the server source code 610 is contained within a single source code file, namely, MathServerDemo.cs. Source code filenames and names of Visual Studio® NET source code representations are denoted using italics. The MathServerDemo.cs source code is illustrated at 800 in FIGS. 8A and 8B.

Server routines 610 (FIG. 6) includes two methods A and B, both of which are tagged with the .NET code attribute "[ServerRemoteMethod]". As is known to those familiar with Visual Studio® .NET, code attributes, such as the [ServerRemoteMethod] attribute, are essentially statements that may be added to any function, member variable, or class of a .NET application. Through reflection, code attributes may be extracted from the resultant .NET assembly post-compilation. As is known in the art, a .NET assembly is a file comprising Microsoft® Intermediate Language (IL) Assembly language, which is a form of byte code (analogous to Java™ byte code). Reflection permits information about a program to be gleaned through examination of its compiled code. As is known in the art, reflection may be performed automatically. For example, when a .NET compact framework, which is the .NET equivalent of a Java™ virtual machine for mobile device platforms, loads an assembly, the framework may "interrogate" (i.e. perform reflection upon) the assembly to identify what the entry points are, so that the executable may be properly invoked. Interrogation may be used to identify methods or member variables of instantiated objects, assuming that the source code has been suitably tagged. In the present example, code attributes are defined for purposes of distinguishing server routines from remote device routines and identifying exposed methods, as will become apparent.

In FIG. 6, the [ServerRemoteMethod] code attribute not only designates a method as remotely invokable at run time, but also designates the computing device at which the executable code for the method will ultimately reside (i.e. the server 502). The code attribute may be specified in the longer form [BlackBerry. Server. ServerRemoteMethod], which is the fully qualified .NET class name, where "ServerRemoteMethod" is the class name and "BlackBerry.Server" is the .NET namespace.

Examining the methods of FIG. 6 in more detail, it can be seen that server method A is an Add method which takes in a single parameter "op" of type Operation and returns the sum of op's two members (fields), which are each of type "double" (floating point values). The source code for method A is illustrated at lines 18 to 21 of FIG. 8A. Server Method B is a Subtract method which also takes a single parameter "op" and returns the difference between the two members. The source code method B is illustrated at lines 29 to 32 of FIG. 8A.

Server routines 610 also include other source code C (e.g. other methods), including at least one direct call ("direct call 3") to an exposed device method ShowMessage (described below) whose purpose is to display a passed text string on the screen of remote device 504 (see line 46 of FIG. 8B).

Remote device routines 620 of FIG. 6 define operation at the remote device 504, which in this example is a wireless handheld communications device. The device routines 620 are defined within two units of source code which are represented within the solution explorer window of the Visual Studio® .NET interface (see FIG. 7), namely, mainform.rf and Application.cs. The developer may specify methods comprising routines 620 as defining operation at remote device 504 by declaring their containing classes to be instances of a remote device base class. For instance a UI screen may be an instance of a "BlackBerry.Device.Forms.Form" class, and a global function may be an instance of a "BlackBerry.Device-.Application" class (where "BlackBerry.Device" is an IDE namespace).

Mainform.rf is a representation of the UI screens and control flow between UI screens for a mobile device application. The mainform.rf source code unit is actually stored as two distinct files.

Figure 9:
FIG. 9 illustrates another portion of the source code for the computer program of FIG. 6.
Figure 10:
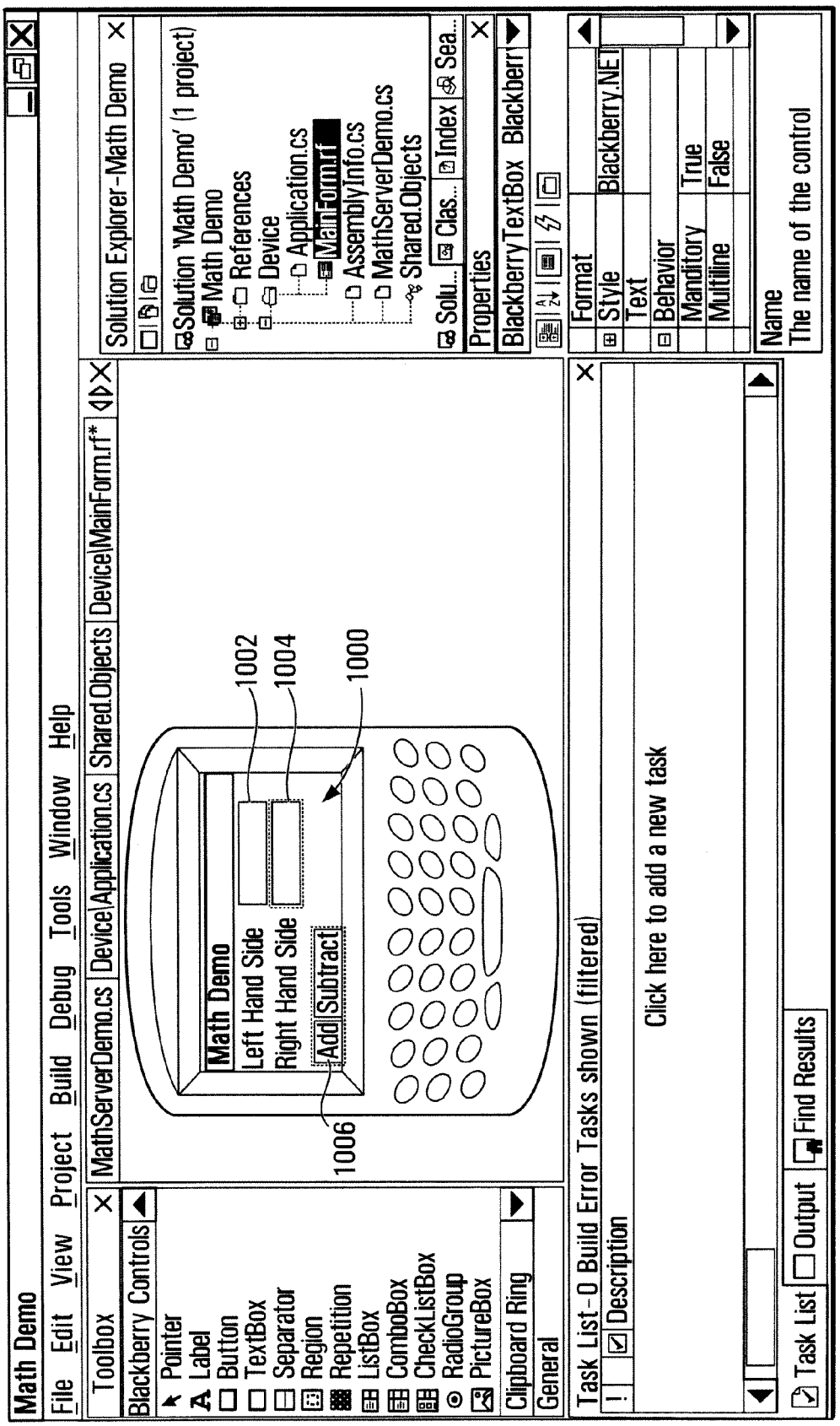
FIG. 10 illustrates a user interface which is displayed at a remote computing device within the distributed system of FIG. 5 at run time.

The first file 900, which is illustrated in FIG. 9, is an XML file which captures the "look and feel" of UI screen layouts for each UI screen in a mobile application. In the present exemplary mobile application, there is only one UI screen 1000, as previously described, which is illustrated in FIG. 10 in the context of the Visual Studio® .NET GUI. The file 900 also maps events, such as button clicks, to device-side code methods. For example, at line 10 of FIG. 9, an "Add" button click is mapped to a device-side code method "AddValues_Click", (described below) which in turn invokes the Add(op) exposed server method A (FIG. 6). This is so that, if a user selects the "add" button 1006 (FIG. 10) at run time, the Add(op) exposed server method will be invoked, thereby causing the numbers entered in fields 1002 and 1004 of the remote device UI 1000 to be added.

The second file constitutes the code which effects the control flow on individual UI screens (e.g. the code that is executed when GUI controls are manipulated) and, if the application has more than one screen, the control flow between UI screens (e.g. the code that causes a next UI screen to be displayed). The source code 1100 of the second file is illustrated in FIGS. 11A and 11B. The above-described invocation of the Add(op) exposed server method A, which corresponds to the Direct Call 1 of FIG. 6, is illustrated at line 27 of FIG. 11A. The invocation of the Subtract( ) exposed server method A, which corresponds to direct call 2 of FIG. 6, is illustrated at line 38 of FIG. 11B. Thus, it will be appreciated that FIGS. 9 and 11A-11B collectively represent source code D of FIG. 6.

Application.cs is a C# source code file containing the main remote device class which includes the entry point into the remote device computer program (see block H of FIG. 6). Application.cs may be thought of as the "business logic" (as opposed to the "look and feel") of the remote device application (i.e., of computer program executing at remote device 504). The Application.cs file is illustrated in FIGS. 12A and 12B at 1200.

As illustrated in FIGS. 12A and 12B, Application.cs also contains two callback methods E and F and an exposed device method G.

Callback methods E and F (FIG. 12A) are developer-coded methods which serve a purpose similar to that served by callback methods or functions traditionally used in multi-threaded asynchronous applications. More specifically, when it is necessary to invoke a function or method that may take a long time to complete, and the caller wishes to avoid becoming blocked pending the completion, the caller may pass a pointer to another function or method, referred to as the "callback" method or function, or simply "callback", that is to be invoked by the called process when execution of the called function or method is completed. This manner of invoking a function is referred to as an asynchronous call. In the present embodiment, callback methods are used because it is possible for wireless communications between the remote device and the server to be intermittent or for the remote device to go offline before the server can complete execution of a called method. By using callbacks, the remote device may continue its operation after invoking an exposed server method, until the result is returned via a callback. In some embodiments (although not this one), callback methods corresponding to exposed Device Remote Methods, could be defined at the server, if permitted by the distributed system's underlying IPC scheme.

In the present embodiment, each callback method of remote device source code 620 (FIG. 6) is authored by the developer according to specific rules which are designed to yield a clear association of the callback method with a corresponding exposed server method of the server source code 610. Specifically, each callback method declaration: has the same name as the exposed server method for which it is a callback; has no return type or a return type of void; accepts one parameter which matches the return type of the exposed server method for which it is a callback; and has a callback code attribute which passes the type of the server class that defines the remote method. These rules may not be applicable in alternative embodiments.

In the example illustrated in FIG. 6, callback methods E and F correspond to exposed server methods A and B respectively. In accordance with the above-noted rules, each callback method E and F takes as its input a single parameter whose type matches the return value of the corresponding server method A or B, which in the present example is "double" for each of callback methods E and F. This permits the result computed by the methods A and B to be passed asynchronously to the callback methods E and F. In the distributed system 500, which is the subject of the illustrated embodiment, callback methods are not invoked directly by the authored server side code, but rather are invoked as part of the communications infrastructure between the server 502 and the remote device 504 (not shown in FIG. 6), as will be described. Callback method E is shown at lines 23-32 of FIG. 12A, while Callback method F is shown at lines 36-43 of FIG. 12B.

Note that a callback method need not necessarily exist for each method tagged with the [ServerRemoteMethod] attribute. For example, if an exposed server method lacks a return value, or if the remote device does not need to act upon the return value, then there may be no need to author a corresponding callback method.

The Application.cs source code file of FIGS. 12A and 12B also includes an exposed device method G, ShowMessage (message), at lines 45-54 (FIG. 12B). The latter method is tagged with the NET code attribute [DeviceRemoteMethod], which not only designates the method as remotely invokable at run time, but also designates the computing device at which the executable code for the method will ultimately reside (i.e. the remote device 504). As described above in respect of [ServerRemoteMethod] tags, the code attribute may actually be specified in a longer form [BlackBerry.Device.DeviceRemoteMethod]. At run time the method G displays a passed string ("message") on the display of the remote device 504. The method G has no return value and no associated client method at the server 502.

Figure 13:
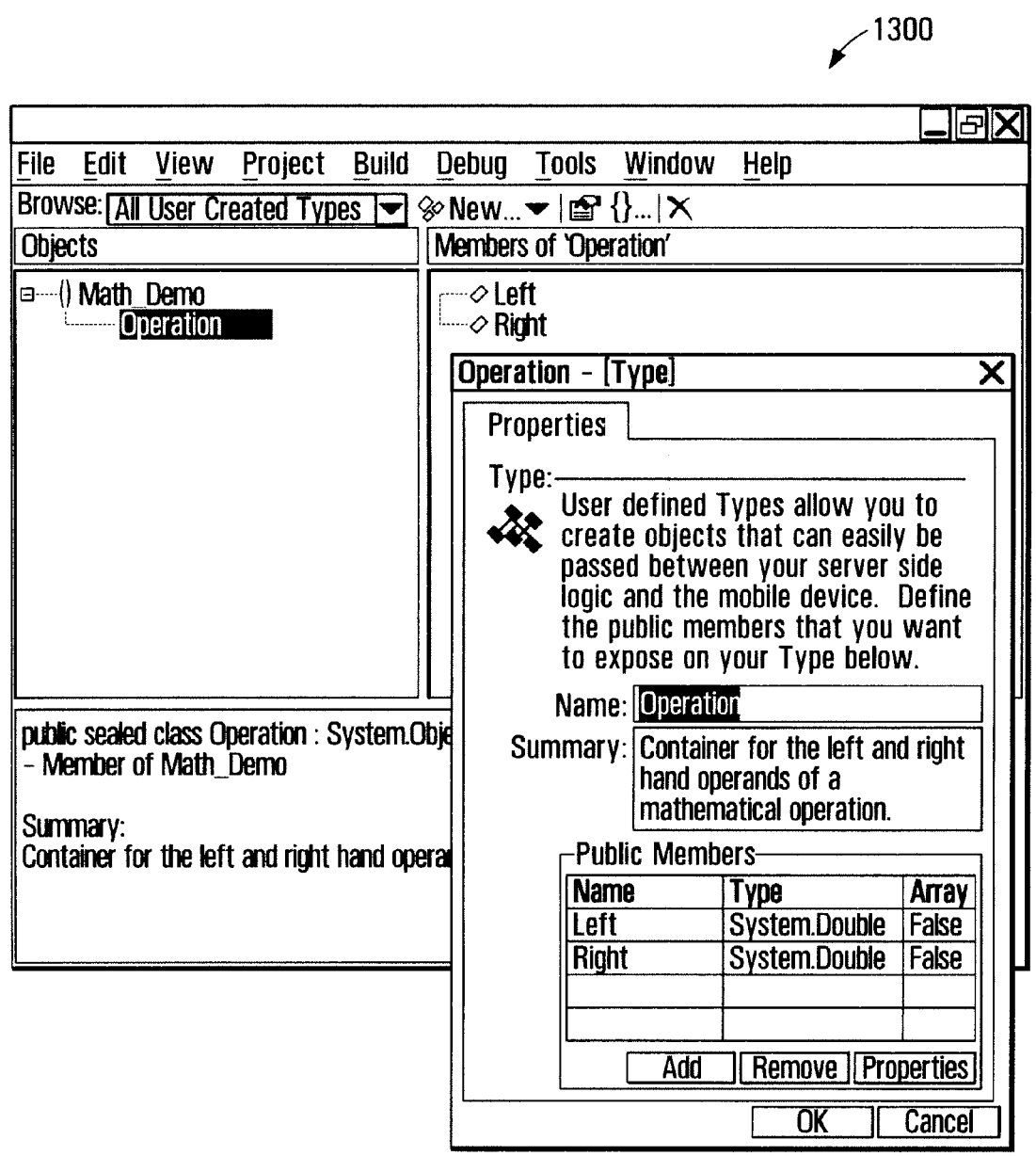
FIG. 13 illustrates an editor which may be used within an IDE for creating shared objects within the computer program of FIG. 6.

Shared object source code 630 of FIG. 6 defines an Operation object which is essentially a type (a class definition) having two fields, Left and Right, each of type double. As shown in FIG. 13, in the exemplary embodiment an editor 1300 has been designed within Visual Studio® .NET in order to facilitate creation of shared objects. In the present embodiment, objects which are defined as shared objects are similar to conventional types or classes, except that they are not permitted to include any user-defined methods and are only built from components consisting of primitives (including booleans, numbers and strings) and other defined shared objects. The latter limitations facilitate representation of the shared objects on multiple computing devices within the distributed system, which devices may be of different types (e.g. having different processors or operating systems).

A shared object is a definition of an object/class that can be used and instantiated on target platforms to which deployment is to occur. This object is passed by "value" rather than by reference to remote interfaces, such that a copy of the data is sent from the calling program. If all target platforms allow for common methods, then additional methods can be added to these classes. In the present embodiment, the editor provides a graphical user interface for designing object/classes. This allows the developer to create an object with attributes and properties suitable for data delivery. These properties may for example be primitive values, other shared objects, arrays of primitives or arrays of other defined shared objects. In turn this graphical editor may generate "code templates" in the language being used so that they can be created and manipulated in both server and device code.

Referring to FIG. 14, a block diagram illustrating the computer programs which result when the computer program 605 of FIG. 6 has been processed by the tool 50 of FIG. 1 is shown. FIG. 14 is analogous to FIG. 4 except that it is specific to the Math Demo application and provides implementation details beyond those shown in FIG. 4, such as the nature of the illustrated computer programs (e.g. whether the programs are in byte code form or in the form of an interpreted language such as Javascript).

Two computer programs 1410 and 1420 are illustrated in FIG. 14. Computer program 1410 represents a first computer program that will be deployed for execution by the server 502 while computer program 1420 represents a second computer program (which actually consists of more than one component, as will be described) that will be deployed for execution by the remote wireless device 504 (FIG. 5).

The first computer program 1410 is a .NET assembly made up of three code blocks, namely, server code blocks 1, 2 and 3. These code blocks are analogous to the server code blocks of the same name in FIG. 4.

Server code block 1 is byte code which has been created through conventional compilation of the authored routines 610 of FIG. 6. Server code block 1 accordingly includes executable code corresponding to each of methods/source code A, B and C. For consistency, the code in FIG. 14 is labelled using the same identifiers as are used in FIG. 6.

Server code blocks 2 and 3, on the other hand, each represent byte code which has been automatically created by the tool 50 (as embodied by the Microsoft Studio.NET IDE, whose function has been pre-programmed) during the build process.

Server code block 2 constitutes communications infrastructure code which has been added for purposes of allowing the server program 410 to remotely invoke the sole exposed device method G of the present example (see FIG. 6). In particular, server code block 2 consists a single stub G' which is created through post-build manipulation of the assembly 1410. The stub G', which is illustrated in FIG. 15, may be created in a two step process. First, the method G may be compiled as originally coded, i.e. from its source code form as illustrated at lines 45-54 (FIG. 12B). Second, the body of the method (i.e. the direct method call) may be replaced with a new body G'$_{body}$, which is shown between the curly braces in FIG. 15. The new body G'$_{body}$ invokes the MessageSender framework, which is a component of the communications infrastructure used to push messages from server applications to mobile device applications. The MessageSender framework is based on the Web Services Eventing specification promulgated by the World Wide Web Consortium (W3C). As is known in the art, the WS-Eventing specification defines a baseline set of operations that allow Web services to provide asynchronous notifications to interested parties. WS-Eventing defines the simplest level of Web services interfaces for notification producers and notification consumers including standard message exchanges to be implemented by service providers that wish to act in these roles, along with operational requirements expected of them. The communications infrastructure is described in the above-referenced U.S. patent applications.

When an event is raised into the WS-eventing system at run time by stub body G'$_{body}$, a chain of two communication "hops" from the server 502 to the remote device 504 causes the appropriate exposed device method to be invoked. The first hop is a communication employing Web services eventing technology from the server to the proxy server 506 (FIG. 5). The second communication is a "compact message" which is sent from the proxy server 506 to the remote device 504 (FIG. 5). The mechanics of these two hops are described in U.S. patent application Ser. No. 11/107,913 entitled SYSTEM AND METHOD FOR GENERIC DATA MAPPING BETWEEN WIRELESS COMPONENT APPLICATIONS AND APPLICATION DATA SOURCES filed on 18 Apr. 2005, now issued as U.S. Pat. No. 7,586,926; and U.S. patent application Ser. No. 10/778,547 entitled SYSTEM AND METHOD OF COMPACT MESSAGING IN NETWORK COMMUNICATIONS BY REMOVING TAGS AND UTILIZING PREDEFINED MESSAGE DEFINITIONS filed on 17 Feb. 2004, now issued as U.S. Pat. No. 7,448,043, referenced above. The two hops are generally represented in FIG. 14 by way of dashed arrow 1430. The fact that remote device method calls are actually implemented through the two communication hops may not be known to the developer. This may advantageously shield the developer from implementation details.

Server code block 3 of program 1410 is a representation of the shared object source code 630 of FIG. 6 after compilation. Server code block 3 contains a byte code representation of the Operation object I defined in source code 630 of FIG. 6. This permits server program 1410 to receive or send parameters of type Operation to or from remote device program 1420 at run time, in a manner that will be described.

As in FIG. 4, the server code blocks 2 and 3 of FIG. 14 are separated from server code block 1 by a dashed line L, which is a notional separator of code whose implementation the developer is required to understand (appearing above the line L) from code whose implementation the developer is not required to understand (appearing below the Line L).

It is noted that the NET assembly which constitutes the server computer program 1410 in the present embodiment does not include any remote device code. This is because remote device methods are removed from the assembly during post-build processing, since code describing operation of the remote device 504 is unnecessary at the server 502. Removal of remote device code may be performed as follows.

First, the assembly may be interrogated to identify methods not declared as either a [DeviceRemoteMethod] (for which stubs are created) or callback method. Second, the identified methods may be removed from the source files before recompilation. This approach assumes that the tool 50 of FIG. 1 has access to source code (which is true within the Visual Studio® .NET IDE). Alternatively, if source code cannot be accessed, it could be possible to remove unneeded methods by manipulating byte code or machine code so as to make recompilation unnecessary, however this may be more difficult and prone to error.

It is further noted that, in the illustrated embodiment, server computer program 410 will not be the only component which is deployed to the server 502 to facilitate operation of the distributed system 500 (FIG. 5) Other components which are not illustrated in FIG. 14 but which are required in accordance with the communication infrastructure, such as .asmx Web services interface file 512 (FIG. 5), are also deployed to facilitate execution of the assembly 710 within the context of the distributed system 500. This will be described in more detail below.

Turning to remote device computer program 720, it is initially noted that the entirety of the program 1420 is illustrated below notional line L, indicating that the developer is not required to understand the implementation of any part of the program 1420. This stems from the fact that, during the build and deployment process for the illustrated example, all of the remote device code is translated from its original authored form (i.e. remote device routines 620 of FIG. 6) into a proprietary form (i.e. a different language) which is required by the remote device 504. This translation occurs automatically during post-build processing and is transparent from the perspective of the developer, so as to shield the developer from having to learn a new programming language or author any proprietary device-side code. Thus the developer may advantageously rely solely upon his or her expertise with respect to the relevant IDE (here, Visual Studio® .NET) and a familiar programming language (here, C#) to develop remote device routines 520 (FIG. 6) which, when deployed, appear to operate as coded, but in fact are translated from their original form.

For consistency with FIG. 6, executable representations of the various source code components D-I of remote device routines 620 are illustrated within executable device computer program 1420 of FIG. 14 using the same identifiers as in FIG. 6, except that in FIG. 4, each identifier has a "'" (prime symbol) suffix to indicate that the component has been translated into a different language.

The remote device program 1420 as translated is made up of two entities. The first entity is an XML file 1422, which includes translated versions D' and I' of source code components D and I. The second entity is Javascript code 1424, which includes translated versions E'-H' source code components E-H.

The portion of XML file 1422 labelled D' in FIG. 14 is created during the build process, from the first (XML) file component of the mainform.rf source code unit (described above) which captures the "look and feel" of the device side UI screens and maps events such as button clicks to device-side methods. Moreover, message declarations for all messages to be sent/received by the remote device 504 as well as script declarations for JavaScript representations of methods/source code E'-H' of FIG. 14, as needed by the run-time environment 530, are added. The run-time environment 530 is described in U.S. patent application Ser. No. 10/788,490 entitled SYSTEM AND METHOD FOR BUILDING WIRELESS APPLICATIONS WITH INTELLIGENT MAPPING BETWEEN USER INTERFACE AND DATA COMPONENTS filed on 1 Mar. 2004, now published under Publication No. 2005/0057560 A1, referenced above.

Since the message and script declarations required by the run-time environment 530 are determined by the nature of the authored remote device-side source code in Application.cs of the present embodiment (see FIG. 6), the remote device-side code is interrogated post-compilation in order to determine what XML message and script declarations need to be added to complete the device-side XML file 1422. The following pseudocode describes the process used to interrogate the remote device code and create the appropriate device XML 1422:

Step 1: Obtain a Document Object Model (DOM) representation of the project source code. As known to those skilled in the art, DOM is a W3C recommendation which defines a platform- and language-neutral interface that allows programs and scripts to dynamically access and/or update the content, structure and style of documents. The current DOM recommendation is DOM Level 3, which is accessible at www.w3.org/TR/DOM-Level-3-Core/, and is hereby incorporated by reference hereinto. For the purpose of creating XML file 1422, a DOM for the metadata of the source code (classes, methods, members, variables and types) is created. Examination of the actual method execution statements (method bodies) is not required. The DOM representation is created by reflecting the .NET Assembly which results when the program 605 of FIG. 6 is compiled using the .NET Reflection API.

Step 2: Enumerate all methods in the Code DOM structure and create the following lists/arrays:
  a) methods with a [DeviceRemoteMethod] tag
  b) methods with a [ServerRemoteMethod] tag
  c) callback methods
  d) local/member variables declared on device screens/forms.
  e) static member variables declared in the main device class for the device application (where the "main" function which starts the device application resides).

The lists/arrays identified in a), b) and c) above are relevant to creating message declarations. The contents of the Main( ) method in e) are translated to JavaScript for the application entry point. Script declarations are created in the present embodiment by parsing the Microsoft® Intermediate Language (MSIL) bytecode of the assembly and translating any methods declared for screens or the device application and translating them into associated JavaScript functions. In the present embodiment, d) is performed because variables require definition in the XML structure of the screen. Local variables are thus converted to screen XML.

Step 3: Add Device XML Messages—i.e. define the format of input messages to the device and output messages from the device which are needed in order to create the illusion at run-time that cross-device direct method calls are in fact possible. In the present embodiment, this entails the following:
  Examine Code DOM for all [ServerRemoteMethods]
  Generate XML representation of exposed server methods as XML Message
  Examine Code DOM for all [DeviceRemoteMethods]
  Generate XML representation of exposed device method as XML Message
  Examine Code DOM for all [Callback] methods
  Generate XML representation of exposed method as XML Message The resultant file, messages.xml, is illustrated in FIG. 16 at 1600. The format of the message which flows from the remote device 504 to the server 502 (FIG. 5) for purposes of invoking the first exposed server method A ("Add") of FIG. 6 is shown at lines 2-5 of FIG. 16. The message format essentially defines a single field "op" of type Operation. The format of a second message which flows from the remote device 504 to the server 502, used to invoke the second exposed server method B ("Subtract"), is shown at lines 10-13. Its format is similar to that of the first message. The format of a message which flows from the server 502 to the remote device 504 for purposes of invoking the sole exposed device method G ("ShowMessage") of FIG. 6 is shown at lines 22-26 of FIG. 16. The message format defines two fields "ID" and "parameters", the latter of which represents a string to be displayed on the display device's UI. Messages used to invoke the callback methods E and F of FIG. 6 are defined at lines 6-9 and 14-17, respectively, of FIG. 16. All of these messages definitions are in accordance with the communications infrastructure, which is described in detail in the U.S. patent applications referenced above.

The portion of XML file 1422 (FIG. 14) labelled I' is created from the class definition I of FIG. 6, and is essentially a platform-neutral representation of the Operation type. The Operation type is defined in XML by the developer during the design phase in Visual Studio .NET®. In the present embodiment, this XML is generated by the editor for creating shared objects (FIG. 13). It is saved both as C# code usable in the code modules and in its XML representation. The XML representation of the Operation type may be as follows:

```
<data name="Operation" persist="true" key=" ">
    <field name="Left" type="decimal" array="false" />
    <field name="Right" type="decimal" array="false" />
</data>
```

A further component of the XML file 1422 (not illustrated in FIG. 14) which is also generated during the build step is a "subscribe" message format definition. The "subscribe" message is sent upon remote device startup, in accordance with the communications infrastructure, for purposes of allowing the server 502 to invoke exposed device method G at the remote device 504 through "push" communications between the server 502 and the remote device 504, as described in more detail below. The subscribe message format definition appears at lines 18-21 of FIG. 16.

The JavaScript component 1424 of remote device executable 720 is also automatically generated during the build process. In the present embodiment, the C# device-side source code within the Application.cs file (FIG. 6) is translated to into ECMA/JavaScript code, as defined by standards document www.ecma-international.org/publications/files/ECMA-ST/Ecma-262.pdf, which is hereby incorporated by reference, to run on the remote device 504. The following steps, which may be similar to the steps performed by other translators for other languages, are performed in order to complete this translation:

Step 1: Parse the C# to a code DOM representation, i.e., a tree-like hierarchical structure representing the source code classes, members/methods and statements. This parsing process is performed using a token-based parser customized for the language being parsed (e.g. for C#, words such as "public", "private" and the "." symbol as a separator are identified as significant, which may differ from the words which are identified as significant in other languages, e.g. tokens such as "→", "BSTR" etc. for C++). Since parsing is performed after a successful compile, the input source code is known to be valid. Upon code DOM tree creation, the tree is input into an ECMA/JavaScript code generator, which performs the following steps 2 and 3. Examples of commercially available translators are those which are included with Visual Studio .NET. These translators consist of Code DOM to C#, Code DOM to VB.NET, and Code DOM to J# translators. In the illustrated embodiment a custom Code DOM to JavaScript translator was created using the same translator base class.

Step 2: Validate the input Code DOM. All device code represented in the code DOM tree, including defined classes, members/methods and statements, are validated to ensure that the code is capable of conversion for, and execution by, the target device. This step is performed even if the compilation of the high-level language was successful because the target device platform may not accept all operations that are possible in the higher-level language. Any errors during this stage are reported to the development environment as build errors. To achieve this goal, the DOM tree of the present embodiment is recursively scanned, checking to make sure that all classes used on the device are supported and that only methods defined on the server as [ServerRemoteMethods] are being called by the device. Since the compile and build process of Visual Studio .NET® allows developers to use the full C# language, some classes or programming techniques that are not supported on the device may have inadvertently been coded by the developer. These are flagged as build errors. Identification of build errors may simply entail comparison of classes and methods in the code DOM tree with a list of classes and methods that cannot be supported by the device.

Note: The validation step may be performed during code generation (i.e. when the C# code is being translated to JavaScript in the post build) instead of in its own initial step.

Step 4: Output translated ECMA/JavaScript code. This is accomplished by traversing the entire code DOM tree, and for each method and operation, converting that method or operation to an equivalent device specific representation.

The Application.cs file code is not the only code translated to ECMA/JavaScript. All the code which is executed upon the detection of user action for each of the screens (i.e. button clicks, menu clicks, focus changes) is also translated to ECMA/JavaScript.

The resultant ECMA/JavaScript for the Math Demo example is illustrated in FIGS. 17A and 17B at 1700. Specifically, the translated Application.cs file code is illustrated at lines 28-58 of FIGS. 17A and 17B, while the remaining code is either executed for various user actions or is executed upon remote device startup, shutdown, or upon the occurrence of an error.

When the components illustrated in FIG. 14 have been created, a deployment tool is used to deploy them (in addition to other components, described below) to the server 502, remote device 504 and proxy server 506, as shown in FIG. 5. The deployment is transparent from the perspective of the developer. It is noted that the deployment of components 1422 and 1424 is initially made to the proxy server 506; these components are later downloaded by the remote device 504 for execution.

Referring to FIG. 5, the distributed system 500 is illustrated following code deployment. Each of the executable code components that has been deployed by the deployment tool is indicated with three asterisks "***" in FIG. 5. Some of the code components, namely, executable server computer program 1410 and components 1422 and 1424 of executable remote device computer program 1420, have already been illustrated and described above in conjunction with FIG. 14. These components are denoted with a heavy border in FIG. 5. The remaining two executable code components are described briefly below and are described in more detail in U.S. patent application Ser. No. 11/107,913 entitled SYSTEM AND METHOD FOR GENERIC DATA MAPPING BETWEEN WIRELESS COMPONENT APPLICATIONS AND APPLICATION DATA SOURCES filed on 18 Apr. 2005, now issued as U.S. Pat. No. 7,586,926; U.S. patent application Ser. No. 11/345,328 entitled SYSTEM AND METHOD FOR CREATING A MAPPING DOCUMENT FOR BINDING MESSAGES BETWEEN AN APPLICATION AND AN ASSOCIATED BACKEND SERVER filed on 2 Feb. 2006, now published as Publication No. 2006/0235928 A1; and U.S. patent application Ser. No. 11/076,054 entitled SYSTEM AND METHOD FOR BUILDING A DEPLOYABLE COMPONENT BASED APPLICATION filed on 10 Mar. 2005, now published as Publication No. 2006/0206890 A1, referenced above.

Web services interface 512 is a file which provides a public interface for exposed server methods (e.g. methods A and B of FIGS. 6 and 14) in the assembly 1410, to make those methods accessible from other computing devices (specifically proxy server 506) using Simple Object Access Protocol (SOAP) and Web services. As is known those of ordinary skill in the art, SOAP is a lightweight, XML based protocol for exchange of information in a decentralized, distributed environment, which consists of three parts: an envelope that defines a framework for describing what is in a message and how to process it, a set of encoding rules for expressing instances of application-defined datatypes, and a convention for representing remote procedure calls and responses. In essence, the Web services interface 512 code converts SOAP method calls to invocations of the relevant methods within the program 1410.

In the present embodiment, the Web services interface 512 takes the form of an .asmx file. An .asmx file is a known Microsoft® Web services interface file format which is similar to the .asp file format. The .asmx file includes a definition file as well as executable code. The definition file puts a "front end" on the assembly methods which are to be exposed for invocation using SOAP. The executable code, on the other hand, is responsible for creating an instance of the assembly 1410, invoking the appropriate exposed server method based on the method called via SOAP, and returning the result through the Web interface. The executable code also provides for run-time translation between the C# versions of objects which are maintained at the server 502 and the XML versions which are passed between server 502 and the proxy server 506 using SOAP. In short, by connecting to the .asmx file via SOAP, a caller (specifically, the proxy server 506) will be able to execute the exposed server methods. The .asmx file is created by using the NET reflection API to identify the exposed server methods in the source code of server program 610 (FIG. 6) as well as their parameters and return values.

The .asmx file also includes "subscribe" and "unsubscribe" methods used for purposes of supporting server-to-remote-device "push" communications, as described below. The .asmx file for the Math Demo program is illustrated at 1800 in FIGS. 18A-18L.

A mapping file 520 is also deployed to the proxy server 506. This file is illustrated in greater detail at 1900 in FIGS.

19A and 19B. The mapping file 520 is a proprietary file which effectively bridges the two "communications hops" described above. The file 520 defines a set of rules by which compact messages sent to or from the remote device 504 are mapped to corresponding SOAP method calls from or to the server 502. For example, when a compact message is received at the proxy server 506, the mapping file 520 is used to map that compact message to a SOAP method call, such that the proxy server 506 accesses the appropriate URL for the appropriate Web service and invokes that method with the supplied parameters. The mapping is bidirectional, i.e., SOAP method calls are mapped to compact messages used to invoke exposed device methods, and compact messages used to invoke exposed server methods are mapped to the exposed server methods.

There is a further component of the XML file 1422 (not expressly illustrated in FIG. 5 or 14) that is also generated during the build stage, whose existence is dictated by the communications infrastructure. The component facilitates the invocation of exposed device methods at the remote device 504 from the server 502 (FIG. 5). Briefly, and as described in the above-referenced U.S. patent application, distributed system 500 of FIG. 5 employs a particular paradigm for "pushing" communications from the server 502 to the remote device 504. Web services eventing is used to notify the proxy server 506 of any events of interest which occur at the server 502, so that the proxy server 506 may in turn notify the remote device 504 of the event (through operation of the mapping file 520) using a compact message. Essentially, by "hard-wiring" each device method stub (e.g. stub G' of FIG. 14) to raise an event every time that it is called, the server 502 is able to trigger the invocation of remote device methods. The communications infrastructure requires the proxy server 506 to initially "subscribe" to the server 502, to apprise it of the events in respect of which notification is desired. Because the proxy server 506 does not act of its own accord, but merely serves as a relay between the server 502 and remote device 504, server subscriptions need to be initiated at the remote device 504.

To create the XML file component which is responsible for initiating such subscriptions, initially, the .asmx Web services interface 512 is modified at the server 502 through addition of exposed "subscribe" and "unsubscribe" methods for each of the exposed device method stubs (G' in the Math Demo example).

As well, at the remote device 504, JavaScript code is added to the OnInit event for the device application, to automatically subscribe to the exposed device method stubs via the Web service. The "OnInit" event is run when the application is first launched on the device.

With this code in place, any calls to exposed device methods (e.g. direct call 3 of FIG. 14) will result in the above-described two communications hops that will result in invocation of the desired remote device method code.

The following pseudo code describes in more detail the process of creating the appropriate device XML for automatic subscription device method stub subscription via interrogation of the device byte code:

Step 1: Obtain a list/array of all of the exposed device methods (method G of FIG. 6 in the example), as described above.

Step 2: For each of the exposed device methods in the list/array created above, do the following:

a) Append subscribe and unsubscribe methods to the server code Webservice as detailed in the WS-Eventing specification.

b) Add JavaScript to the OnInit Event in the device code to automatically subscribe to the exposed device methods on start up of the device-side executable 720.

Ultimately, when the various components 1420, 510, 512, 520, 1422 and 1424 illustrated in FIG. 5 are deployed as shown and executed, the operation of the distributed system 500 will be as coded by the developer within computer program 605 (FIG. 6), despite the fact that the actual implementation is much more involved.

In an alternative embodiment, a developer wanting to create a distributed Inventory and Accounting distributed system could use the same approach for developing distributed software. The developer may simply create two classes InventoryClass and AccountingClass.

The InventoryClass class may include various types of inventory functions for the company's remote warehouse. These functions consist of incrementing and decrementing quantities in stock, searching for specific part numbers and ordering more items when quantity in stock reach re-fill thresholds. As in many inventory applications, the systems may be tightly aligned with the accounting portions of the company. However in this implementation the accounting system for this company resides at the head office which is in a different city from the warehouse, where the inventory system resides.

The AccountingClass class may handle the purchase ordering of items to be re-stocked into inventory, maintaining cost of goods sold, taxes and the sale of all the items that are eventually shipped from the warehouse where the Inventory system resides.

The company may have the following process when a sales person sells an item to a customer:

The customer places an order for 10 items. The salesperson accesses their Accounting application and places an order for these 10 items, entering the customer's shipping information.

This would then indicate to the Warehouse to ship these 10 items to the customer. The warehouse total would then be decremented by the 10 ordered items. As soon as the items are shipped out to the customer, the Warehouse may notify the Accounting application that the items have been shipped.

In this case, the decrementing of the 10 items from inventory triggers the re-fill thresholds for this item, so the Warehouse will notify the accounting software to place an order for 20 more items to re-fill the warehouse to the appropriate re-stocking level. The Accounting system would then place the order for the items from the supplier.

When the re-stocked items arrived at the warehouse, the warehouse would notify the accounting software that the goods have been received.

For the implementation of this application the IPC mechanism could be SOAP via Webservices.

The AccountingClass might be declared with the following "[Exposed]" methods:

OrderShipped(integer OrderId)

ReStock(string PartNo, integer Quantity) returns integer RestockOrderID

ReStockReceived(integer RestockOrderID)

The InventoryClass might be declared with the following "[Exposed]" methods:

PlaceOrder(string PartNo, integer OrderId, Customer Address)

In this embodiment, each class defines a set of routines which is based on commonality of purpose or logically cohesive functionality (i.e. accounting versus inventory), rather than the identity of a computing device for which operation is defined.

The shared class "Customer" could be defined as follows:
CustId: string
Name: string
Street: string
City: string
Province: string
Country: string The implementation of this embodiment would then be similar to the Math Demo example above, with the exception that the number of output programs may be based on a compile-time determination (e.g. as configured by a developer) of the identity of the computing devices at which the accounting routines and inventory routines will be executed. For example, if both sets of routines may be executed at the same computing device, a single output computer program may be created for those two sets of routines, in which case no stubs or IPC mechanisms would be needed because direct method calls could be effected as coded. In this case, the designation of a subset of routines as "[exposed]" (remotely invokable) has no effect, because no remote invocation is necessary.

As will be appreciated by those skilled in the art, modifications to the above-described embodiment can be made without departing from the essence of the invention. These modifications will be apparent to those skilled in the art and, therefore, the invention is defined in the claims.

What is claimed is:

1. A computer-implemented method comprising:
identifying a first set of routines in a computer program which define operation of a first computing device in a distributed system, a subset of said first set of routines being designated as remotely invokable at run time;
further identifying a second set of routines in said computer program which define operation of a second computing device in said distributed system, said second set of routines including at least one direct call to a routine of said subset; and
based on said first set of routines, said subset of said routines, and said second set of routines, creating:
a first computer program, including routines which are functionally equivalent to said first set of routines, for execution by said first computing device; and
a second computer program, including routines which are functionally equivalent to said second set of routines, for execution by said second computing device, wherein said at least one direct call to said routine of said subset is emulated with instructions for remotely invoking a functional equivalent of said routine within said first computer program by way of an inter-process communication mechanism supported by said distributed system,
wherein each of said identifying and said further identifying comprises performing reflection upon compiled code which has been compiled from source code of said computer program, and
wherein said creating a second computer program comprises:
based on said identified second set of routines, isolating source code associated with said second set of routines from the source code of said computer program, said isolating resulting in isolated source code;
from said isolated source code, creating source code which is functionally equivalent to said isolated source code, said creating resulting in functionally equivalent source code;
for each routine of said subset of routines, generating source code for a stub routine having a same signature as said routine of said subset but containing instructions for remotely invoking a functionally equivalent routine within said first computer program using an inter-process communication mechanism supported by said distributed system, said generating resulting in stub routine source code; and
generating, from said functionally equivalent source code and said stub routine source code, an executable version of said second computer program.

2. The method of claim 1 wherein said creating source code which is functionally equivalent to said isolated source code comprises copying said isolated source code.

3. The method of claim 1 wherein said creating source code which is functionally equivalent to said isolated source code comprises translating said isolated source code into another programming language.

4. The method of claim 1 wherein said generating an executable version of said second computer program comprises compiling said functionally equivalent source code and said stub routine source code.

5. A machine-readable storage medium containing machine-executable code for creating distributed software, said machine-executable code, upon execution by a processor of a computing device, causing said computing device to:
identify a first set of routines in a computer program which define operation of a first computing device in a distributed system, a subset of said first set of routines being designated as remotely invokable at run time;
further identify a second set of routines in said computer program which define operation of a second computing device in said distributed system, said second set of routines including at least one direct call to a routine of said subset; and
create, based on said first set of routines, said subset of said routines, and said second set of routines:
a first computer program including routines which are functionally equivalent to said first set of routines for execution by said first computing device; and
a second computer program including routines which are functionally equivalent to said second set of routines for execution by said second computing device, wherein said at least one direct call to said routine of said subset is emulated with instructions for remotely invoking a functional equivalent of said routine within said first computer program by way of an inter-process communication mechanism supported by said distributed system,
wherein each of said identifying and said further identifying comprises performing reflection upon compiled code which has been compiled from source code of said computer program, and
wherein said creating a second computer program comprises:
based on said identified second set of routines, isolating source code associated with said second set of routines from the source code of said computer program, said isolating resulting in isolated source code;
creating source code from said isolated source code which is functionally equivalent to said isolated source code, said creating resulting in functionally equivalent source code;
generating, for each routine of said subset of routines, source code for a stub routine having a same signature as said routine of said subset but containing instructions for remotely invoking an functionally equivalent routine within said first computer program using an inter-process communication mechanism supported by said distributed system, said generating resulting in stub routine source code; and generating, from said functionally equivalent source code and said stub routine source code, an executable version of said second computer program.

6. The machine-readable storage medium of claim 5 wherein said creating source code which is functionally equivalent to said isolated source code comprises copying said isolated source code.

7. The machine-readable storage medium of claim 5 wherein said creating source code which is functionally equivalent to said isolated source code comprises translating said isolated source code into another programming language.

8. The machine-readable storage medium of claim 5 wherein said generating an executable version of said second computer program comprises compiling said functionally equivalent source code and said stub routine source code.

9. A computing device comprising a processor and memory storing machine-executable code for creating distributed software, said machine-executable code, upon execution by said processor, causing said computing device to:

identify a first set of routines in a computer program which define operation of a first computing device in a distributed system, a subset of said first set of routines being designated as remotely invokable at run time;

further identify a second set of routines in said computer program which define operation of a second computing device in said distributed system, said second set of routines including at least one direct call to a routine of said subset; and create, based on said first set of routines, said subset of said routines, and said second set of routines:

a first computer program including routines which are functionally equivalent to said first set of routines for execution by said first computing device; and a second computer program including routines which are functionally equivalent to said second set of routines for execution by said second computing device, wherein said at least one direct call to said routine of said subset is emulated with instructions for remotely invoking a functional equivalent of said routine within said first computer program by way of an inter-process communication mechanism supported by said distributed system, wherein each of said identifying and said further identifying comprises performing reflection upon compiled code which has been compiled from source code of said computer program, and wherein said creating a second computer program comprises:

based on said identified second set of routines, isolating source code associated with said second set of routines from the source code of said computer program, said isolating resulting in isolated source code;

creating source code from said isolated source code which is functionally equivalent to said isolated source code, said creating resulting in functionally equivalent source code;

generating, for each routine of said subset of routines, source code for a stub routine having a same signature as said routine of said subset but containing instructions for remotely invoking an functionally equivalent routine within said first computer program using an inter-process communication mechanism supported by said distributed system, said generating resulting in stub routine source code; and generating, from said functionally equivalent source code and said stub routine source code, an executable version of said second computer program.

10. The computing device claim 9 wherein said creating source code which is functionally equivalent to said isolated source code comprises copying said isolated source code.

11. The computing device of claim 9 wherein said creating source code which is functionally equivalent to said isolated source code comprises translating said isolated source code into another programming language.

12. The computing device of claim 9 wherein said generating an executable version of said second computer program comprises compiling said functionally equivalent source code and said stub routine source code.

* * * * *